US012578934B2

(12) United States Patent
Du et al.

(10) Patent No.: US 12,578,934 B2
(45) Date of Patent: Mar. 17, 2026

(54) VISUAL PROGRAMMING PLATFORM FEATURING MACHINE LEARNING FOR AUTOMATED CODE DEVELOPMENT

(71) Applicant: Google LLC, Mountain View, CA (US)

(72) Inventors: Ruofei Du, San Francisco, CA (US); Zhongyi Zhou, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 201 days.

(21) Appl. No.: 18/468,025

(22) Filed: Sep. 15, 2023

(65) Prior Publication Data

US 2025/0094137 A1     Mar. 20, 2025

(51) Int. Cl.
  *G06F 9/44*      (2018.01)
  *G06F 8/33*      (2018.01)
  *G06F 8/34*      (2018.01)
  *G06F 8/77*      (2018.01)
  *G06F 9/451*     (2018.01)
  *G06N 3/088*     (2023.01)
  *G06N 20/00*     (2019.01)

(52) U.S. Cl.
  CPC . *G06F 8/34* (2013.01); *G06F 8/33* (2013.01)

(58) Field of Classification Search
  CPC ... G06F 8/33; G06F 8/34; G06F 9/453; G06F 40/284; G06F 8/30; G06F 8/36; G06F 8/77; G06F 40/174; G06F 8/31; G06F 8/35; G06F 40/30; G06F 8/75; G06F 8/315; G06F 18/20; G06F 8/38; G06F 11/3466; G06F 8/4441; G06F 8/71; G06F 16/24578; G06F 9/451; G06F 40/232; G06F 40/166; G06F 40/253; G06F 16/93; G06N 20/00; G06N 3/045; G06N 3/04; G06N 3/084

See application file for complete search history.

(56) References Cited

U.S. PATENT DOCUMENTS

| | | | |
|---|---|---|---|
| 7,000,191 B2 * | 2/2006 | Schmitt | G05B 19/056 |
| | | | 715/965 |
| 9,720,983 B1 * | 8/2017 | Yu | G06Q 30/02 |
| 11,609,748 B2 * | 3/2023 | Bahrami | G06F 8/75 |
| 12,007,877 B1 * | 6/2024 | Garg | G06F 11/3698 |

* cited by examiner

*Primary Examiner* — Thuy Dao

(74) *Attorney, Agent, or Firm* — DORITY & MANNING P.A.

(57)     ABSTRACT

A visual programming platform can leverage a machine learning-based coding system to generate an initial set of programming-language code for further graphical editing by a human user. As an example, the visual programming platform can obtain a natural language description of a task to be performed by a computational pipeline. The visual programming platform can process the natural language description of the task with a machine learning coding system that includes one or more machine-learned models to generate, as an output of the machine learning coding system, a set of pseudocode that describes performance of the task. The platform can process the set of pseudocode that describes performance of the task with a compiler to generate a set of programming-language code that defines the computational pipeline for performing the task. The visual programming platform can generate a graphical visualization of the computational pipeline defined by the set of programming-language code.

20 Claims, 15 Drawing Sheets

VISUAL PROGRAMMING PLATFORM FEATURING MACHINE LEARNING FOR AUTOMATED CODE DEVELOPMENT

FIELD

The present disclosure relates generally to a visual programming platform that enables the graphical development of a software application. More particularly, the present disclosure relates to a visual programming platform that leverages a machine learning-based coding system to generate an initial set of programming-language code for further graphical editing by a human user in an interactive graphical user interface.

BACKGROUND

In traditional software development, code is written in a text-based programming language, such as C++, Java, or Python, among others. A programmer enters commands in a specific syntax to create a set of instructions for a computer to execute. This process requires a high level of expertise in the programming language and a deep understanding of the logic and algorithms used to solve problems. As a result, software development can be time-consuming and error-prone, with a steep learning curve for those new to the field.

Furthermore, text-based programming often lacks intuitiveness and visibility in terms of the flow of logic and data because the coded instructions do not provide a visual representation of the software's functionality. Consequently, comprehension and debugging of the code can be challenging, especially for complex software systems.

In recent years, visual programming has emerged as an alternative to traditional text-based programming. Visual programming platforms allow developers to manipulate program elements graphically rather than by specifying them textually. A visual programming platform allows programming with visual expressions, spatial arrangements of text and graphic symbols used either as elements of syntax or secondary notation. However, existing visual programming platforms often lack the flexibility, robustness, and comprehensive feature set required for developing complex software applications.

SUMMARY

Aspects and advantages of embodiments of the present disclosure will be set forth in part in the following description, or can be learned from the description, or can be learned through practice of the embodiments.

One example aspect of the present disclosure is directed to a visual programming platform that enables the graphical development of software code. The visual programming platform is implemented by one or more computing devices and configured to perform operations. The operations include obtaining a natural language description of a task to be performed by a computational pipeline. The operations include processing the natural language description of the task with a machine learning coding system comprising one or more machine-learned models to generate, as an output of the machine learning coding system, a set of pseudocode that describes performance of the task. The operations include processing the set of pseudocode that describes performance of the task with a compiler to generate a set of programming-language code that defines the computational pipeline for performing the task. The operations include generating a graphical visualization of the computational pipeline defined by the set of programming-language code. The operations include providing the graphical visualization of the computational pipeline for display in an interactive user interface that enables a human user to edit the graphical visualization to modify the set of programming-language code.

Another example aspect of the present disclosure is directed to computer-implemented method for finetuning a sequence processing model to perform a pseudocode drafting task. The method includes obtaining, by a computing system comprising one or more computing devices, a training tuple, the training tuple comprising a natural language description of a computational pipeline and a set of programming-language code that defines the computational pipeline. The method includes decompiling, by the computing system, the set of programming-language code to generate a set of ground truth pseudocode. The method includes processing, by the computing system, the natural language description of the computational pipeline with the sequence processing model to generate a set of predicted pseudocode. The method includes evaluating, by the computing system, a loss function that compares the set of predicted pseudocode with the set of ground truth pseudocode. The method includes modifying, by the computing system, one or more values of one or more parameters of the sequence processing model based on the loss function.

Another example aspect of the present disclosure is directed to one or more non-transitory computer-readable media that store computer-executable instructions that, when executed, cause a computing system to perform operations. The operations include obtaining a natural language description of a task to be performed by a computational pipeline. The operations include processing the natural language description of the task with a machine learning coding system comprising one or more machine-learned models to generate, as an output of the machine learning coding system, a set of pseudocode that describes performance of the task. The operations include processing the set of pseudocode that describes performance of the task with a compiler to generate a set of programming-language code that defines the computational pipeline for performing the task. The operations include generating a graphical visualization of the computational pipeline defined by the set of programming-language code. The operations include providing the graphical visualization of the computational pipeline for display in an interactive user interface that enables a human user to edit the graphical visualization to modify the set of programming-language code.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended FIG.s, in which.

Figure 1:
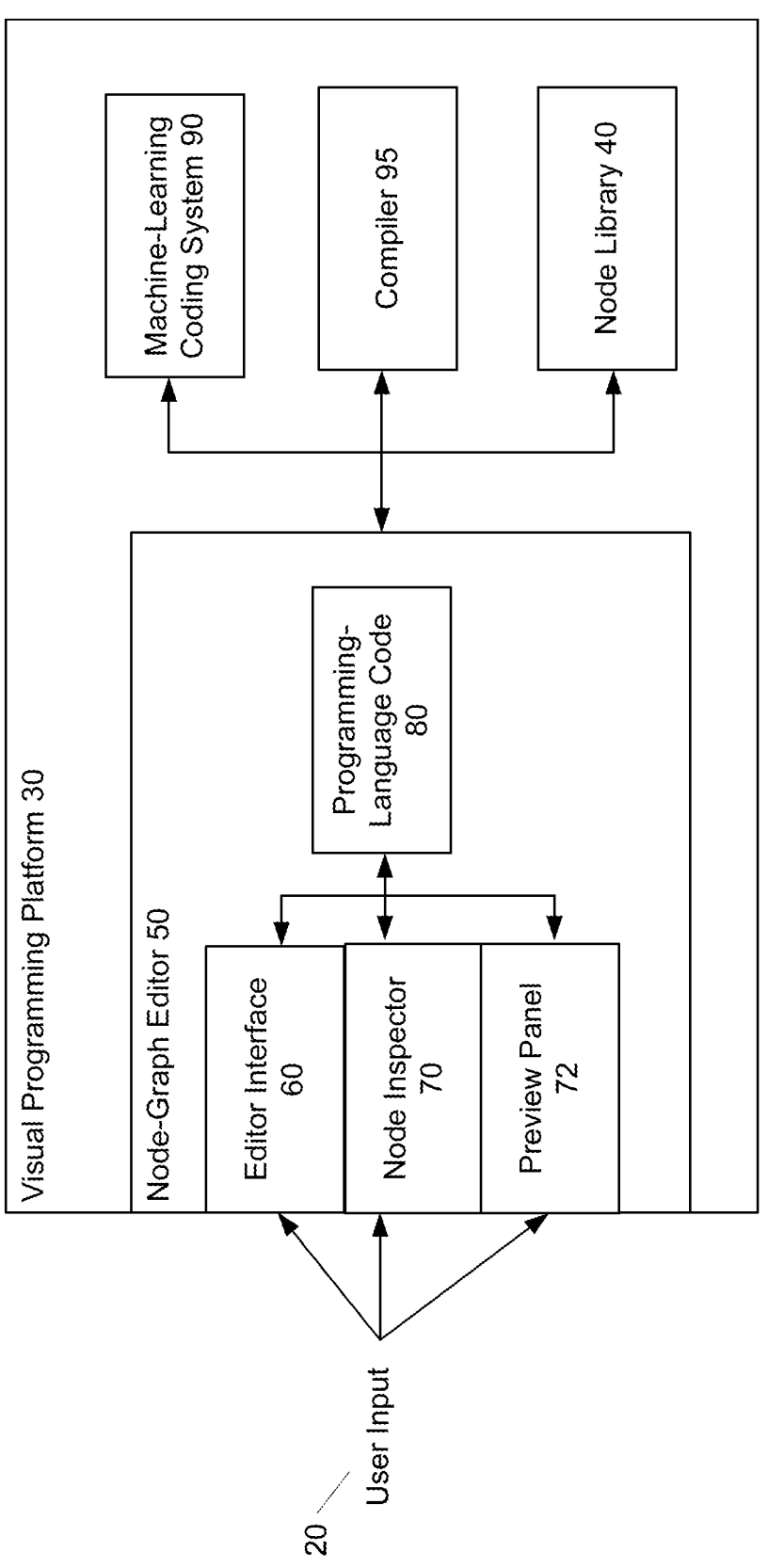
FIG. 1 depicts a block diagram of an example visual programming platform according to example embodiments of the present disclosure.

Reference numerals that are repeated across plural FIG.s are intended to identify the same features in various implementations.

DETAILED DESCRIPTION

Generally, the present disclosure is directed to a visual programming platform that enables the graphical development of software code. Specifically, the visual programming platform can leverage a machine learning-based coding system to generate an initial set of programming-language code for further graphical editing by a human user. As an example, the visual programming platform can obtain a natural language description of a task to be performed by a computational pipeline. The visual programming platform can process the natural language description of the task with a machine learning coding system that includes one or more machine-learned models to generate, as an output of the machine learning coding system, a set of pseudocode that describes performance of the task. The platform can process the set of pseudocode that describes performance of the task with a compiler to generate a set of programming-language code that defines the computational pipeline for performing the task. The visual programming platform can generate a graphical visualization of the computational pipeline defined by the set of programming-language code. The visual programming platform can provide the graphical visualization of the computational pipeline for display in an interactive user interface that enables a human user to edit the graphical visualization to modify the set of programming-language code.

More particularly, the visual programming platforms described herein can provide an interactive and user-friendly interface for the graphical development of software code. The platform allows developers, regardless of their skill level, to create software programs by using graphical representations of functionalities instead of writing traditional text-based code. The platform transforms coding into a more intuitive and visually engaging task, making it accessible to a broader range of individuals. It can also enhance the efficiency, accuracy, and speed of the software development process by providing real-time visual feedback, drag-and-drop components, and customizable templates.

Specifically, a user can interact with the visual programming platform to generate programming-language code for implementing a computational pipeline. A computational pipeline can refer to a sequence of data processing stages where the output of one stage is the input to the next. Using the visual programming platform, users can easily design and generate code for a computational pipeline by dragging and dropping graphical representations of different processing stages onto a working canvas. For example, in some implementations, each stage in the computational pipeline can be represented by graphical elements that represent an input source or format, an operation to be performed, and/or an output source or format.

Users can visually arrange and/or connect these components in the desired sequence to represent the flow of data through the pipeline. The platform can then translate this graphical configuration into programming-language software code and vice versa, providing real-time visual feedback to help users identify and correct any errors or inefficiencies in the pipeline design. This not only simplifies the coding process but also enhances the understanding of the computational pipeline's structure and behavior, leading to more efficient and effective software development.

According to an aspect of the present disclosure, the visual programming platform can include a machine learning-based coding system that is able to automatically initialize and/or edit the programming-language code for the computational pipeline being built by a user. More particularly, an example visual programming platform interface may typically initialize with a blank layout. For users who are unfamiliar with the platform or programming in general, they might find it difficult to make their first step, and do not know where to start to build the computational pipeline.

To resolve this challenge, the present disclosure provides machine-learning based tools that support users to intuitively and rapidly generate a pipeline in the visual programming platform. Specifically, to initialize a new computational pipeline, all the user needs to do is simply provide a natural language description of the desired computational pipeline (e.g., in a text entry field of the platform's user interface). This process is "intuitive" because natural language descriptions are the most common way that people will interact in a human-human-collaboration process: a designer may simply describe a system design proposal to an engineer, and the engineer may reply with a machine learning structure.

Thus, to automatically initialize a computational pipeline within the visual programming platform, the visual programming platform can first obtain a natural language description of a task to be performed by a computational pipeline. The natural language description can be obtained in a variety of ways. For instance, it could be entered by the human user (e.g., developer or engineer) who is working within the visual programming platform, obtained from written documentation or user manuals related to the pipeline, or extracted from meetings and brainstorming sessions where the task was discussed. The natural language description can provide a high-level, human-understandable explanation of the processes involved, the purpose of the task, and/or the expected outcome.

The visual programming platform can process the natural language description of the task with a machine learning coding system that includes one or more machine-learned models to generate a set of pseudocode as an output of the machine learning coding system. As an example, the one or more machine-learned models can include one or more generative sequence processing models. One example of a generative sequence processing model is a so-called "large language model."

The pseudocode generated by the machine learning coding system can describe performance of the task. Specifically, the set of pseudocode can be a structured, high-level, human-readable representation of a computer algorithm, not intended for direct execution, but to convey the logical flow and operations of the algorithm.

Next, the platform can process the set of pseudocode with a compiler to generate a set of programming-language code that defines the computational pipeline for performing the task. For example, the compiler can be a rule-based software tool that translates the set of pseudocode written in a high-level human-readable representation into programming-language code. Programming-language code can include a set of instructions written in a defined syntax of a specific programming language, intended for execution by a computer or computing environment.

Then, the visual programming platform can generate a graphical visualization of the computational pipeline defined by the set of programming-language code. For example, the visual programming platform can map each instruction or component from the set of programming-language code to corresponding graphical components that represent data flows and relationships (e.g., inputs, outputs, operations, etc.) in a visual format.

The visual programming platform can then provide the graphical visualization of the computational pipeline for display in an interactive user interface that enables a human user to edit the graphical visualization to modify the set of programming-language code. Then, if a user adjusts the graphical components on the working canvas, the visual programming platform can dynamically update the corresponding programming-language code to reflect changes in the computational pipeline's structure and operations.

Thus, by leveraging the machine-learning coding system, the visual programming platform is able to quickly initialize a computational pipeline within the visual programming interface. Users will be able to quickly evaluate whether or not the initial prototype pipeline fits their expectations. If not, the user can interact with the visual programming interface to revise components in the generated pipelines. As compared to the user starting a pipeline from a blank layout, the proposed approach significantly reduces the effort required to generate a computational pipeline.

The systems and methods of the present disclosure provide a number of technical effects and benefits. As examples, the proposed approach can save computational resources by reducing the complexity of software development. In particular, the proposed approaches can eliminate the need for extensive custom coding. This can reduce the overall complexity of the codebase, resulting in smaller code sizes and fewer lines of code to be compiled and/or executed, which can save computational resources. Furthermore, reducing the amount of time spent by a human performing code creation can result in a reduced usage of computational resources such as processor cycles or memory usage. Stated differently, the proposed approach will generally result in faster development of the software application, which can reduce the amount of computational resources used over time. More generally, the present disclosure enables more efficient development, execution, and maintenance of applications, resulting in optimized utilization of computational resources.

One example technical contribution of the present disclosure is the proposed tools and algorithms for transforming a user's natural language input into an initial pseudocode or programming-language representation of the computational pipeline. For example, the algorithm can be implemented using a sequence processing model (e.g., a large language model).

Another example technical contribution is the process of generating and applying a dataset to enable performance of the described techniques. For example, to finetune a sequence processing model towards the proposed techniques, a data collection process can be performed in which a number of contributors use the visual programming platform to build pipelines. For each pipeline, the contributor can contribute the following items to a code repository: "a task description" which explains the structure of the pipeline and what the pipeline can be used for; a programming-language file that represents the pipeline; and/or an image (or video) file that illustrates the overview of the pipeline. The sequence processing model can then be trained (e.g., finetuned) on this dataset, which can improve its performance at the tasks described herein.

With reference now to the FIG.s, example embodiments of the present disclosure will be discussed in further detail.

FIG. 1 illustrates a block diagram of a visual programming platform 30. The platform 30 can include a collection of tools, technologies, and resources that can enable users to develop software applications. For instance, the visual programming platform 30 can include various programming languages, integrated development environments (IDEs), libraries and frameworks, runtime environments, testing and debugging tools, deployment and DevOps tools, as well as documentation and community resources. These components can offer a unified and organized environment for developers to design, code, test, and deploy applications efficiently. In some instances, the visual programming platform 30 can be referred to as a Rapid Application Prototyping System for Artificial Intelligence (Rapsai or RAP-SAI).

As illustrated in FIG. 1, the visual programming platform 30 can incorporate a nodes library 40. The nodes library 40 can be a central repository of pre-made components or code sets (referred to as "nodes") that users can incorporate into their applications. The node library 40 can include a comprehensive collection of nodes to cover a wide range of applications.

As examples, the nodes can include input nodes, visual effect nodes, basic arithmetic operations, data transformation, machine learning algorithms or model nodes, output nodes, and/or nodes that perform various operations. Example nodes can facilitate data collection, data augmentation, model integration, visualization of model results, and/or data pre and post-processing respectively.

Thus, in some implementations, the nodes in the node library 40 can include nodes that represent distinct machine learning models and/or fundamental processes integral to machine learning workflows. As an example, some nodes can include and/or execute pre-trained machine learning models such as BERT or ResNet, allowing for their immediate utilization without additional training, while other nodes can represent custom models tailored by users. As another example, some nodes can be specifically designed for adjusting model configurations, introducing hyperparameters, and evaluating model performance against standard metrics. These nodes can ensure that the model's adaptability and assessment can be managed seamlessly within the platform 30.

Furthermore, the node library 40 can include nodes that streamline essential machine learning processes. As examples, nodes dedicated to data pre-processing can be configured to handle tasks like normalization and encoding, ensuring data is aptly prepared for subsequent operations. Augmentation nodes can introduce data variations, enhancing dataset robustness. Other operations like model training, feature extraction, and/or optimization can be facilitated by nodes designed for those specific functions. Additionally, post-model development processes, such as model deployment, can also be addressed through nodes that enable model exportation and integration with external systems.

In some implementations, the nodes in the node library 40 can be implemented as functions or classes in a programming language such as, for example, Python or JavaScript. Each node can encapsulate a specific functionality, ensuring modularity and reusability. The node library 40 can also provide an interface for users to create and contribute their own custom nodes.

The visual programming platform 30 can also include a node-graph editor 50. The node-graph editor 50 can be a tool that enables the visual creation and editing of the flow of data and control in a computational pipeline through interactions with a graphical user interface. Example graphical user interfaces are described in further detail elsewhere herein.

In particular, the node-graph editor 50 can be responsible for providing an interactive canvas in a user interface. The node-graph editor 50 can receive user input 20 that creates or modifies a node-graph that defines the computational pipeline. As one example, the node-graph editor 50 can provide a graphical user interface that includes an editor interface 60, a node inspector 70, and a preview panel 72.

The editor interface 60 can enable users to create and manipulate software components represented as nodes in a node-graph. For instance, the users can drag and drop pre-existing nodes or code sets, connect them in a desired sequence, and configure their properties to implement a specific functionality. For example, within the editor interface 60 provided by the node-graph editor 50, users can add nodes from the node library 40, connect them with lines representing data flow, and/or set their properties. The editor interface 60 can also support advanced features such as zooming, panning, grouping, and more. It can also implement automatic layout algorithms to arrange nodes neatly and help users understand complex graphs easily.

In some implementations, the editor interface 60 of the node-graph editor 50 can be implemented using HTML5

Canvas, SVG, or WebGL, depending on the level of interactivity and visual complexity required. Alternatively or additionally, the node-graph editor 50 can integrate with a remote server through Firebase and utilize JavaScript, TensorFlow.js, Arcs.js, and/or three.js for various functionalities.

The node-graph editor 50 can also provide a node inspector 70. The node inspector 70 can be a tool for inspecting and modifying the properties of nodes in the graph represented within the visual editor interface 60. It can be implemented as a side panel that displays the properties of the currently selected node. The node inspector 70 can provide various controls such as text fields, sliders, checkboxes, and dropdown lists for users to edit properties.

The node inspector 70 can also allow users to modify properties by uploading new datasets, tweaking model parameters, or adjusting visualizations. It can categorize properties into persistent and instantaneous, allowing users to save their settings or experiment without permanently changing the node. The node inspector 70 can also provide a preview of the node's output, helping users understand its effect on the overall application.

The node-graph editor 50 can also provide a preview panel 72. The preview panel 72, as integrated within the node-graph editor 50, can visualize real-time outcomes of the computational pipeline as structured by the node-graph in the editor interface 60. This dynamic representation facilitates a more intuitive understanding for users of the effects and interactions of the nodes in the graph without requiring them to execute the entire pipeline outside the editor. This immediate feedback loop promotes iterative development, allowing users to fine-tune and make necessary adjustments to the node-graph swiftly based on the visible outcomes in the preview.

The preview panel 72 can cater to different types of node-graph outcomes, whether it be data visualizations, graphical simulations, text outputs, or any other computation results. The preview can be rendered in various formats suitable for the outcome type, such as charts, 3D models, or simple console logs. In some implementations, the preview panel 72 can offer a play, pause, or step-through functionality, allowing users to navigate through the computational process at their own pace. This aids in debugging and understanding intricate data flows and transformations in the pipeline.

In some implementations, the node-graph editor 50 can manage a set of programming-language code 80. This set of programming-language code 80 can include instructions that define and control the operations of the nodes from the node library 40. The code 80 can be written in any suitable programming language such as Python, JavaScript, C++, and/or JSON. The editor interface 60 represents a visual interface for creating, modifying, and organizing this code 80, with the details of the code abstracted into visual representations.

The set of programming-language code 80 can include and guide the interoperation of nodes from the node library 40. Specifically, the code 80 can define how the nodes interact with each other to perform a computational pipeline. For example, the code 80 can include instructions that determine how data flows between nodes, how nodes process input data and generate output data, and how nodes respond to user input. The code 80 can also control the execution order of nodes, enabling the creation of sophisticated workflows.

Furthermore, any edits to the computational graph via user inputs 20 to the editor interface 60 or the node inspector 70 can result in the node-graph editor 50 updating the set of programming-language code 80. For instance, if a user modifies a node's properties via the node inspector 70, the node-graph editor 50 can update the corresponding code 80 to reflect these changes. Similarly, if a user changes the data flow between nodes using the editor interface 60, the node-graph editor 50 can adjust the code 80 to ensure the correct execution order.

In this way, the node-graph editor 50 maintains a continuous synchronization between the visual representation of the computational graph and the underlying programming-language code 80. This can help users understand the code's structure and functionality, even if they are not experienced programmers. Moreover, it can enable users to design and implement complex applications in a visual, intuitive, and efficient manner.

In some implementations, the visual programming platform 30 can optimize performance by leveraging GPU computing throughout the pipeline, especially crucial for real-time multimedia applications. In some implementations, for model inference, the visual programming platform 30 can employ an off-screen WebGL context, taking advantage of TensorFlow.js. In data augmentation nodes, the visual programming platform 30 can use a hardware-accelerated HTML canvas to ensure real-time processing.

The visual programming platform 30 can be utilized in numerous applications. It can accelerate several steps of the ML product cycle, such as pipeline authoring, model evaluation, data pipelining, model and pipeline experimentation, and more. In some implementations, this functionality can be facilitated through a JavaScript front-end library for low/no code editing and a separate JS library for embedding the newly created experience.

According to an aspect of the present disclosure, the visual programming platform 30 can include a machine learning-based coding system 90 that is able to automatically initialize and/or edit the programming-language code 80 for the computational pipeline being built by a user. Specifically, to initialize a new computational pipeline, all the user needs to do is simply provide (e.g., via user input 20) a natural language description of the desired computational pipeline (e.g., in a text entry field of the of the editor interface 60). This process is "intuitive" because natural language descriptions are the most common way that people will interact in a human-human-collaboration process: a designer may simply describe a system design proposal to an engineer, and the engineer may reply with a machine learning structure.

Thus, to automatically initialize a computational pipeline within the visual programming platform 30, the visual programming platform 30 can first obtain a natural language description of a task to be performed by a computational pipeline. The natural language description can be obtained in a variety of ways. For instance, it could be entered by the human user (e.g., developer or engineer) who is working within the visual programming platform 30, obtained from written documentation or user manuals related to the pipeline, or extracted from meetings and brainstorming sessions where the task was discussed. The natural language description can provide a high-level, human-understandable explanation of the processes involved, the purpose of the task, and/or the expected outcome.

The visual programming platform 30 can process the natural language description of the task with the machine learning coding system 90 to generate a set of pseudocode as an output of the machine learning coding system 90. As an example, the coding system 90 can include one or more machine-learned models which may be one or more generative sequence processing models. One example of a generative sequence processing model is a so-called "large language model." Example implementations of the machine learning coding system 90 will be discussed in further detail with reference to FIG. 2.

Referring still to FIG. 1, the pseudocode generated by the machine learning coding system 90 can describe performance of the task. Specifically, the set of pseudocode can be a structured, high-level, human-readable representation of a computer algorithm, not intended for direct execution, but to convey the logical flow and operations of the algorithm.

Next, the platform 30 can process the set of pseudocode with a compiler 95 to generate an initial version of the set of programming-language code 80 that defines the computational pipeline for performing the task. Programming-language code 80 can include a set of instructions written in a defined syntax of a specific programming language, intended for execution by a computer or computing environment. As one example, the programming-language code 80 can be a directed acyclic graph in JSON format. The JSON file can contain node names, directed edges between the nodes, parameters of the nodes, and layout of the nodes.

In some implementations, the compiler 95 can be a rule-based software tool that translates the set of pseudocode written in a high-level human-readable representation into the programming-language code 80. For example, the compiler 95 can identify references to certain nodes from the node library 40 and can replace the reference to the node with the full programming-language code associated with that node in the library 40. In this manner, for example, the compiler 95 can operate to transform the pseudocode into the programming-language code 80 that represents the computational pipeline as a graph or other structured data that include a series of the nodes from the library 40.

In some implementations, the compiler 95 can operate to clean up or otherwise debug the pseudocode when generating the programming-language code 80. For example, the compiler can identify and remove references to nodes that do not exist within the node library 40. For example, the compiler 95 can compile each reference to a non-existent node into a corresponding placeholder node. For example, the placeholder node can be the node from the node library 40 that is most similar to the errantly-referenced node. The compiler 95 can alert the user that they to need to reconfigure the placeholder node.

Thus, in some implementations, the compiler 95 can perform some or all of the following: (1) Lexical Analysis: Using a series of regular expressions, the pseudocode is tokenized into node type, node name, and node parameters. (2) Semantic Analysis: Type checking is performed on each tokenized node to validate input/output connections between nodes and to identify potential cyclic graphs. If all integrity checks are met, memory allocation for the node and its corresponding edges is performed in a "syntax graph". (3) Graph Generation: With the syntax graph, the JSON code is generated from the graph while conducting an autofilling process. For example, the text input nodes may contain auto-generated text, whereas other nodes are initialized with default parameters. (4) Graph Rendering and Optimization: Finally, the generated graph is traversed using a breadth-first search algorithm, and the nodes are laid out in the node-graph editor 50.

Referring still to FIG. 1, and as described in detail above, the node-graph editor 50 can generate a graphical visualization of the computational pipeline defined by the set of programming-language code 80. For example, the node-graph editor 50 can map each instruction or component (e.g., nodes) from the set of programming-language code 80 to corresponding graphical components that represent data flows and relationships (e.g., inputs, outputs, operations, etc.) in a visual format. The node-graph editor 50 can then provide the graphical visualization of the computational pipeline for display in the editor interface 60.

Thus, by leveraging the machine-learning coding system 90, the visual programming platform 30 is able to quickly initialize a computational pipeline within the editor interface 60. As compared to the user starting a pipeline from a blank layout, the proposed approach significantly reduces the effort required to generate a computational pipeline.

Figure 2:
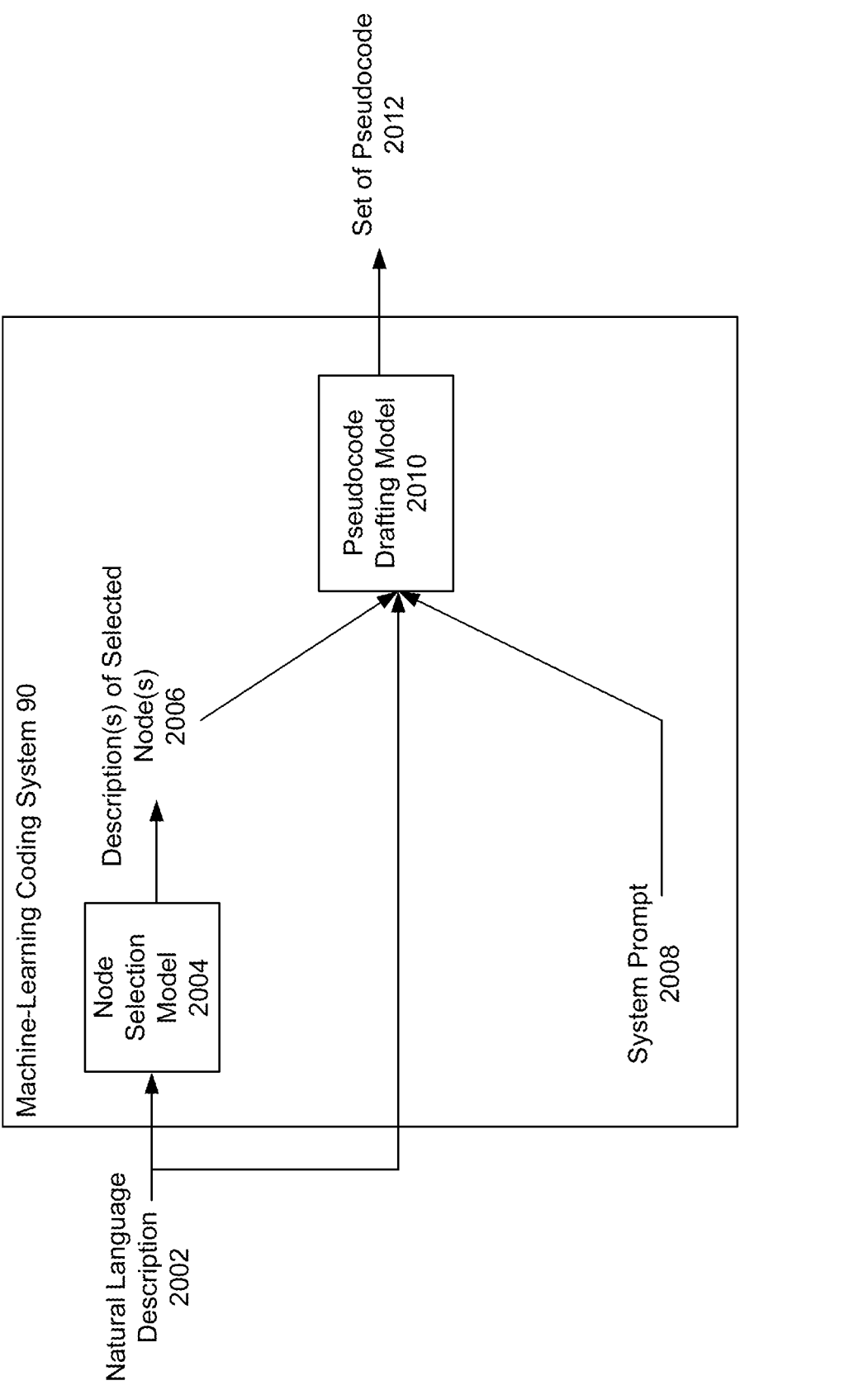
FIG. 2 depicts a block diagram of an example machine-learning coding system according to example embodiments of the present disclosure.

FIG. 2 depicts a block diagram of an example embodiment of the machine-learning coding system 90 shown in FIG. 1. FIG. 2 is provided as an example only, other configurations are possible.

As shown in FIG. 2, the machine-learning coding system 90 can include a node selection model 2004 and a pseudo-code drafting model 2010. The machine-learning coding system 90 can employ these models to generate a set of pseudocode 2012 that describes operation of a computational pipeline from a natural language description 2002 of the computational pipeline.

In particular, the node selection model 2004 can receive the natural language description 2002 of a computational pipeline. The node selection model 2004 can operate select one or more nodes from a library of nodes based on the natural language description 2002. For example, the library of nodes may include a very large number of nodes. Because there is such a large number of nodes, it may not be possible (e.g., due to context window or other input size constraints associated with the pseudocode drafting model 2010) to provide the pseudocode drafting model 2010 with a description of all possible nodes that can be used (e.g., all nodes in the library). Therefore, the node selection model 2004 can select some number of nodes that are most likely to be included in the computational pipeline and description(s) of these node(s) 2006 can then be provided to the pseudocode drafting model 2010.

In some implementations, the node selection model 2004 can be a pretrained model that has not been further finetuned for the node selection task. In other implementations, the node selection model 2004 can have been trained (e.g., finetuned) on training pairs that demonstrate the correct selection output of node(s) based on example input natural language descriptions.

In one example, the node selection model 2004 can be a multi-class classification model. The classification model can be trained using a supervised learning approach on training pairs that demonstrate the correct classification (e.g., selection) output of node(s) based on example input natural language descriptions.

In another example, the node selection model 2004 can be a sequence processing model such as a large language model. In some implementations, to prompt the node selection model 2004 to select the nodes, the node selection model 2004 can be supplied with a "few shot" prompt that includes a few examples of the correct selection of node(s) based on example natural language descriptions. For example, for the node selection model 2004, the computing system can prompt the model 2004 with a very brief description of each node, aiming to filter out unrelated nodes for the target pipeline.

To provide an example solely for the purpose of explanation, the following is an example of a prompt that can be given to the node selection model 2004. This prompt is an example only, different prompts could be used alternatively.

You are an assistant tasked with aiding the user in constructing an AI pipeline.

For this assignment, select a small set of nodes to fulfill the user's pipeline request.

Guidelines:

1. In your selection, include at least one node from each category: 'input', 'processor', and 'output'.

2. Ensure you incorporate all necessary nodes. Opting for a few additional nodes, if required, is acceptable.

3. Limit your selection to a maximum of 10 nodes.

Below are the nodes you may select from:

input### live_camera: Capture video stream through your device camera.

input_image: Select images to use as input to your pipeline. You can also upload your own images.

input_text: Add text to use as input to your pipeline.

output### image_viewer: View images.

threed_photo: Create a 3D photo effect from depthmap tensors.

markdown_viewer: Render Markdown strings into stylized HTML.

html_viewer: Show HTML content with styles processor### body_segmentation: Segment out people in images.

tensor_to_depthmap: Display tensor data as a depthmap.

portrait_depth: Generate a 3D depthmap for an image.

face_landmark: Detect faces in images. Each face contains 468 keypoints.

pose_landmark: Generate body positional mappings for people detected in images.

image_processor: Process an image (crop, resize, shear, rotate, change brightness or contrast, add blur or noise).

text_processor: Reformat and combine multiple text inputs.

mask_visualizer: Visualize masks.

image_mixer: Combine images and text into one output image. Requires two image inputs.

virtual_sticker: Use face landmarks data to overlay virtual stickers on images.

palm_textgen: Generate Text using a large language model.

keywords_to_image: Search image by keywords url_to_html: Crawl the website by a given URL.

image_to_text: Extract text from image using OCR service pali: Answer questions about an image using a vision-language model.

palm_model: Generate text using a large language model based on prompt and context.

imagen: Generate an image based on a text prompt input_sheet: Read string data from Google Sheets.

EXAMPLES

Q:

{'description': 'generate a photo and validate whether it is real or generated.', 'tag': 'multimodal'}

A:

['pali', 'input_text', 'imagen', 'markdown_viewer']

Q:

{'description': 'Write LaTeX code given a worksheet', 'tag': 'language'}

A:

['text_processor', 'input_text', 'input_sheet', 'markdown_viewer', 'palm_textgen']

Q:

{'description': 'modify a image content by editing its caption and generate another image based on the caption', 'tag': 'multimodal'}

A:

['imagen', 'pali', 'text_processor', 'input_text', 'image_viewer', 'input_image', 'palm_textgen']

Q:

{'description': 'write an introduction of HCI and then summarize it', 'tag': 'language'}

A:

['text_processor', 'input_text', 'palm_textgen', 'html_viewer']

Q:

{'description': 'Review a project proposal about AI by simulating discussion among CTO, CFO and CEO.', 'tag': 'language'}

A:

['text_processor', 'input_text', 'markdown_viewer', 'palm_textgen', 'palm_model']

Q:

{'description': 'write a proposal given the field and the audience', 'tag': 'language'}

A:

['palm_textgen', 'text_processor', 'input_text', 'markdown_viewer']

Q:

{'description': 'ask whether the medicine in the image can treat my stomach pain', 'tag': 'multimodal'}

A:

['pali', 'text_processor', 'input_text', 'input_image', 'html_viewer', 'palm_model']

Q:

{'description': 'Put a generated hat on head of the person in the live camera', 'tag': 'multimodal'}

A:

['live_camera', 'input_text', 'image_viewer', 'virtual_sticker', 'face_landmark', 'keywords_to_image']

Q:

{'description': 'detect whether a person is looking at the camera', 'tag': 'multimodal'}

A:

['pali', 'input_text', 'markdown_viewer', 'input_image']

Q:

{'description': 'blur the background of my webcam', 'tag': 'visual'}

A:

['mask_visualizer', 'image_processor', 'body_segmentation', 'live_camera', 'image_viewer', 'image_mixer']

Q:

{'description': 'cast animation eyes on my eyes', 'tag': 'visual'} A:

['image_processor', 'live_camera', 'landmark_visualizer', 'input_text', 'image_viewer', 'virtual_sticker', 'face_landmark', 'keywords_to_image']

Q:

{'description': 'Search news and do fact check', 'tag': 'language'}

A:

['google_search', 'text_processor', 'input_text', 'html_viewer', 'palm_textgen', 'url_to_html']

Q:

{'description': 'create a depth map on an image', 'tag': 'visual'}

A:

['threed_photo', 'portrait_depth', 'tensor_to_depthmap', 'image_viewer', 'input_image']

As described above, the node selection model 2004 can generate an output that selects some number of nodes from the library of nodes. Then, the pseudocode drafting model 2010 can receive descriptions of the selected nodes 2006, the natural language description 2002, and a system prompt 2008.

Figure 3:
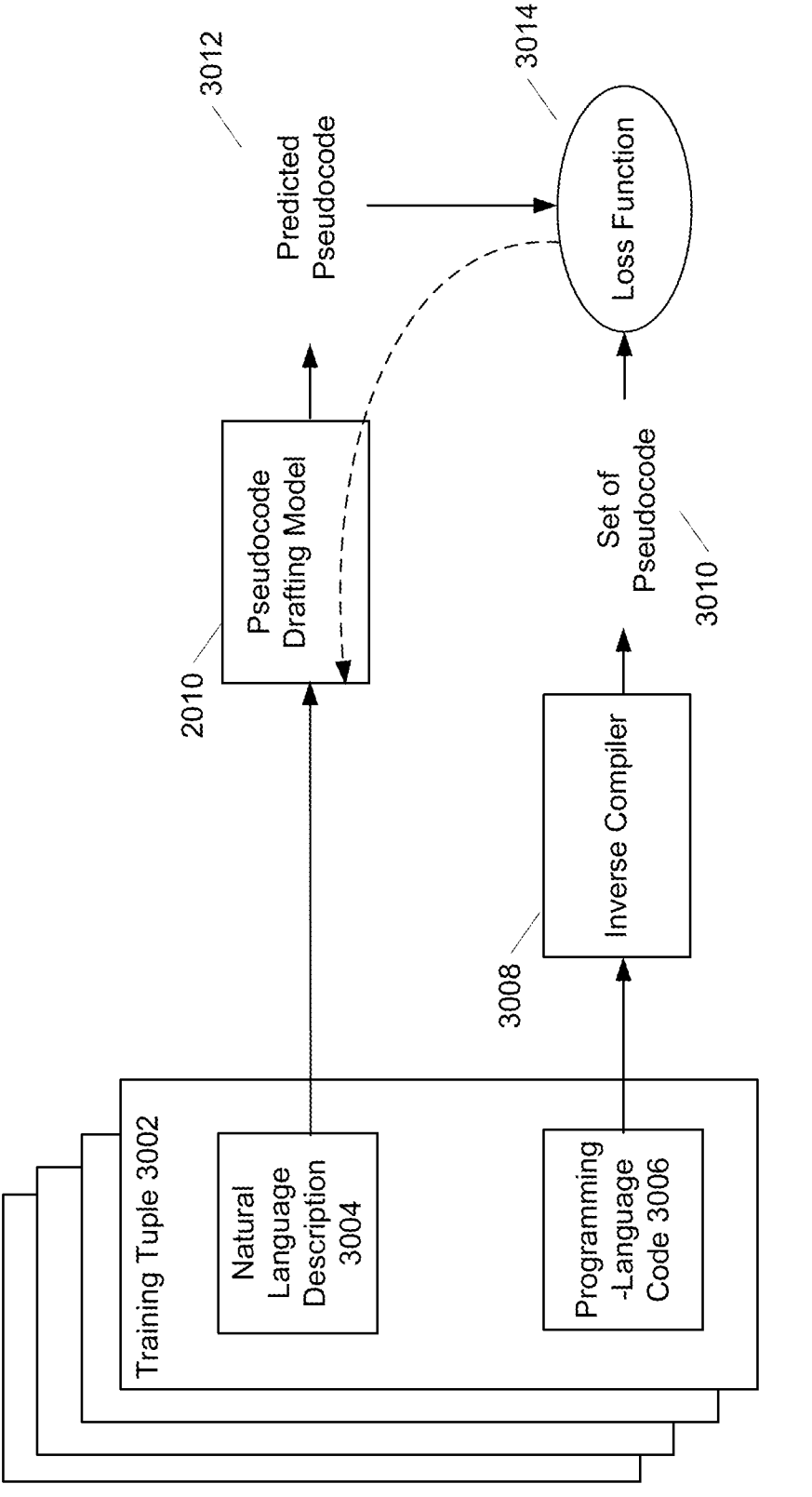
FIG. 3 depicts an example data flow for training a pseudocode drafting model according to example embodiments of the present disclosure.

In some implementations, the pseudocode drafting model 2010 can be a pretrained model that has not been further finetuned for the pseudocode drafting task. In other implementations, the pseudocode drafting model 2010 can have been trained (e.g., finetuned) on training tuples that demonstrate a ground truth output pseudocode generated from an input natural language description. For example, FIG. 3 depicts an example technique for training (e.g., finetuning) an example pseudocode drafting model 2010.

In some implementations, the pseudocode drafting model 2010 can be a sequence processing model such as a large language model. In some implementations, to prompt the pseudocode drafting model 2010 to generate the set of pseudocode 2012, the pseudocode drafting model 2010 can be supplied with a "few shot" prompt that includes a few examples of the correct output pseudocode based on example natural language descriptions. In some implementations, the few shot examples included in the prompt can be selected based on a tag applied to the pipeline by the user (e.g., example tags can be "language", "visual", and/or "multimodal").

In some implementations, the description of each selected node 2006 can include examples of applications that can be generated by the node. In some implementations, the descriptions of the selected nodes 2006 can be structured descriptions of each node such as, for each node, a structured description of category, input type, output type, and a pseudocode example. Thus, in some implementations, the descriptions of the selected nodes 2006 can include a detailed configuration for each selected node with additional information including 1) input data types, 2) output data types, and 3) an example, represented in pseudo codes, showing how this node connects to other nodes.

The system prompt 2008 can describe one or more rules for the pseudocode drafting model 2010 to follow when generating the set of pseudocode 2012. The system prompt may also include other context-guidance or information usable to guide the output of the pseudocode drafting model 2010 via instruction following.

To provide an example solely for the purpose of explanation, the following is an example of a prompt that can be given to the pseudocode drafting model 2010. This prompt is an example only, different prompts could be used alternatively.

You are a programmer responsible for helping the user design an AI pipeline.

Upon receiving a concise description from the user about the desired functionality of the pipeline, you should generate the whole pipeline using pseudocode.

Guidelines:

1. Respond solely in pseudocode, without additional commentary.

2. Utilize ONLY the nodes listed below; introducing new nodes is not permitted.

3. Ensure there's a minimum of one line in each pseudocode category: 'input', 'output', and 'processor'.

Below are the nodes you can incorporate into the pipeline:

```
{"nodeSpecId": "live_camera", "description": "Capture video stream through your device
camera.", "category": "input", "outputSpecs": {"image": {"type": "image"}}, "examples":
["live_camera_ukb70x: live_camera( );
gesture_recognition_usmt1l_out = gesture_recognition_usmt1l:
gesture_recognition(image=live_camera_ukb70x);
"]}
{"nodeSpecId": "keywords_to_image", "description": "Search image by keywords",
"category": "processor", "inputSpecs": {"keywords": {"type": "string"}}, "outputSpecs":
{"image": {"type": "image"}}, "examples": ["input_text_otz238: input_text(text="A dog
with a cat");
keywords_to_image_wndpjw_out = keywords_to_image_wndpjw:
keywords_to_image(keywords=input_text_otz238);
image_viewer_vgoikb: image_viewer(images=keywords_to_image_wndpjw_out);
"]}
{"nodeSpecId": "image_mixer", "description": "Combine images and text into one output
image. Requires two image inputs.", "category": "processor", "inputSpecs": {"image1":
{"type": "image"}, "image2": {"type": "image"}, "topText": {"type": "string"},
"midText": {"type": "string"}, "bottomText": {"type": "string"}}, "outputSpecs":
{"image": {"type": "image"}}, "examples": ["live_camera_gulibs: live_camera( );
input_image_owbpm5: input_image( );
body_segmentation_lpspdi_out = body_segmentation_lpspdi:
body_segmentation(image=live_camera_gulibs);
mask_visualizer_4iqqui_out = mask_visualizer_4iqqui:
mask_visualizer(image=live_camera_gulibs,
segmentationResult=body_segmentation_lpspdi_out);
image_mixer_b99dqs_out = image_mixer_b99dqs:
image_mixer(image1=input_image_owbpm5, image2=mask_visualizer_4iqqui_out);
image_viewer_vb3sa8: image_viewer(images=image_mixer_b99dqs_out);
"]}
{"nodeSpecId": "virtual_sticker", "description": "Use face landmarks data to overlay
virtual stickers on images.", "category": "processor", "inputSpecs": {"landmarkResult":
{"type": "landmarkResult"}, "stickerImage": {"type": "image"}, "originalImage":
{"type": "image"}}, "outputSpecs": {"image": {"type": "image"}}, "examples":
["live_camera_jwj5tf: live_camera( );
input_image_lubfam: input_image( );
face_landmark_jsjkem_out = face_landmark_jsjkem:
face_landmark(image=live_camera_jwj5tf);
virtual_sticker_m6q79c_out = virtual_sticker_m6q79c:
virtual_sticker(landmarkResult=face_landmark_jsjkem_out,
stickerImage=input_image_lubfam, originalImage=live_camera_jwj5tf);
"]}
{"nodeSpecId": "face_landmark", "description": "Detect faces in images. Each face
contains 468 keypoints.", "category": "processor", "inputSpecs": {"image": {"type":
"image"}, "staticImage": {"type": "boolean"}}, "outputSpecs": {"landmarkResult":
{"type": "landmarkResult", "recommendedNodes": ["landmark_visualizer",
"virtual_sticker"]}}, "examples": ["input_image_8z0n6a: input_image( );
face_landmark_erhgn7_out = face_landmark_erhgn7:
face_landmark(image=input_image_8z0n6a);
landmark_visualizer_gq73xx_out = landmark_visualizer_gq73xx:
landmark_visualizer(landmarkResult=face_landmark_erhgn7_out,
image=input_image_8z0n6a);
"]}
{"nodeSpecId": "image_viewer", "description": "View images.", "category": "output",
"inputSpecs": {"images": {"type": "image", "multiple": true}, "urls": {"type": "string",
"multiple": true}}, "examples": ["input_text_pbu1a2: input_text(text="sushi");
keywords_to_image_sqyxfz_out = keywords_to_image_sqyxfz:
keywords_to_image(keywords=input_text_pbu1a2);
image_viewer_x471pk: image_viewer(images=keywords_to_image_sqyxfz_out);
"]}
```

The following is a full list of nodes you may also use but
those not included above are not recommended:

```
# Input
["input_text", "input_image", "live_camera", ]
# Processor
["body_segmentation", "face_landmark", "image_mixer", "image_processor",
"image_to_text", "imagen", "input_sheet", "keywords_to_image", "mask_visualizer",
"pali", "palm_model", "palm_textgen", "portrait_depth", "pose_landmark",
"tensor_to_depthmap", "text_processor", "url_to_html", "virtual_sticker"]
# Output
["html_viewer", "markdown_viewer", "image_viewer", "threed_photo"]
```

EXAMPLES

Q:

blur the background of my webcam

A:

Input### live_camera_asvni3: live_camera( )

Output### image_viewer_4ifa3o: image_viewer (images=image_
   mixer_qiv6if_out);

Processor### body_segmentation_guf4ru_out=body_segmentation_
   guf4ru:

body_segmentation (image=live_camera_asvni3);

body_segmentation_smbd2j_out=body_segmentation_
   smbd2j:

body_segmentation (image=live_camera_asvni3);

mask_visualizer_44h3um_out=mask_visualizer_44h3um:

mask_visualizer (image=live_camera_asvni3, segmentationResult=body_segmentation_guf4ru_out);

image_processor_2mbc5u_out=image_processor_
   2mbc5u:

image_processor (image=mask_visualizer_44h3um_out);

mask_visualizer_rj2ng8_out=mask_visualizer_rj2ng8:

mask_visualizer (image=live_camera_asvni3, segmentationResult=body_segmentation_smbd2j_out);

image_mixer_qiv6if_out=image_mixer_qiv6if:

image_mixer (image1=image_processor_2mbc5u_out, image2=mask_visualizer_rj2ng8_out);

Q:

cast animation eyes on my eyes

A:

Input### live_camera_asvni3: live_camera( )

input_text_43u831: input_text (text="animate eyes");

Output### image_viewer_vxmot5: image_viewer (images=virtual_
   sticker_gowe99_out);

image_viewer_aottla: image_viewer (images=landmark_
   visualizer_w5j5ak_out);

Processor### face_landmark_bmctuv_out=face_landmark_bmctuv:

face_landmark (image=live_camera_asvni3);

keywords_to_image_3gkkff_out=keywords_to_image_
   3gkkff:

keywords_to_image (keywords=input_text_43u831);

image_processor_jrkx8h_out=image_processor_jrkx8h:

image_processor
   (image=keywords_to_image_3gkkff_out);

landmark_visualizer_w5j5ak_out=landmark_visualizer_
   w5j5ak:

landmark_visualizer
   (landmarkResult=face_landmark_bmctuv_out, image=live_camera_asvni3);

virtual_sticker_gowe99_out=virtual_sticker_gowe99:

virtual_sticker
   (landmarkResult=face_landmark_bmctuv_out, stickerImage=image_processor_jrkx8h_out, originalImage=live_camera_asvni3);

Q:

create a depth map on an image

A:

Input### input_image_53x9ug: input_image( );

Output### threed_photo_8jibhs: threed_photo (image=input_
   image_53x9ug, depthMapTensor=portrait_depth_wktq5i_out);

image_viewer_z7sph5: image_viewer (images=tensor_
   to_depthmap_wmhuec_out);

Processor### portrait_depth_wktq5i_out=portrait_depth_wktq5i:

portrait_depth (image=input_image_53x9ug);

tensor_to_depthmap_wmhuec_out=tensor_to_
   depthmap_wmhuec:

tensor_to_depthmap
   (tensor=portrait_depth_wktq5i_out);

As described above, the pseudocode drafting model 2010 can output the set of pseudocode 2012 based on the received input(s). For example, the set of pseudocode 2012 can define the computational pipeline in terms of a node-graph structure. The set of pseudocode 2012 can be expressed in a custom pseudocode language that demonstrates various properties (e.g., the ability to fit within a certain token length limitation). The set of pseudocode 2012 can be functional code, object-oriented code, and/or natural language descriptions.

As described with reference to FIG. 1, the set of pseudocode 2012 can then be processed by a compiler to generate a set of programming-language code. To provide an example solely for the purpose of explanation, the following is an example compiler output expressed in JSON. This output is an example only.

```
{
  "nodes": [
    {
      "id": "live_camera_asvni3",
      "nodeSpecId": "live_camera",
      "customData": {
        "runContinuously": true,
        "initialWidth": 240,
        "initialHeight": 320,
        "previewX": 16,
        "previewY": 16,
        "previewWidth": 240,
        "previewHeight": 320
      },
      "uiData": {
        "posX": 41,
        "posY": 27,
        "width": 176,
        "selected": false,
        "hovered": false
      },
      "propValues": {
        "hidePreview": false
      }
    },
    {
      "id": "input_text_43u831",
      "nodeSpecId": "input_text",
      "customData": {
        "initialWidth": 304,
        "initialHeight": 144,
        "previewX": 16,
        "previewY": 16,
        "previewWidth": 304,
        "previewHeight": 144
      },
      "uiData": {
        "posX": 64,
        "posY": 64,
        "width": 176,
        "selected": false,
        "hovered": false
      },
```

-continued

-continued

```
    "propValues": {
        "text": "sunglass",
        "passwordMode": false,
        "hidePreview": false
    }
},
{
    "id": "face_landmark_bmctuv",
    "nodeSpecId": "face_landmark",
    "customData": {
        "rightOfNode": "",
        "previewX": 944,
        "previewY": 16,
        "previewWidth": 320,
        "previewHeight": 240
    },
    "uiData": {
        "posX": 496,
        "posY": 336,
        "width": 176,
        "selected": false,
        "hovered": false
    }
    "inputValues": {
        "staticImage": false
    },
    "incomingEdges": {
        "image": [
            {
                "sourceNodeId": "live_camera_asvni3",
                "outputId": "image"
            }
        ]
    }
},
{
    "id": "keywords_to_image_3gkkff",
    "nodeSpecId": "keywords_to_image",
    "uiData": {
        "posX": 272,
        "posY": 32,
        "width": 176,
        "selected": false,
        "hovered": false
    },
    "inputValues": {
        "keywords": ""
    },
    "incomingEdges": {
        "keywords": [
            {
                "sourceNodeId": "input_text_43u831",
                "outputId": "text"
            }
        ]
    }
},
{
    "id": "image_processor_jrkx8h",
    "nodeSpecId": "image_processor",
    "customData": {
        "initialWidth": 480,
        "initialHeight": 384,
        "rightOfNode": "",
        "previewX": 1152,
        "previewY": 16,
        "previewWidth": 480,
        "previewHeight": 384
    },
    "uiData": {
        "posX": 208,
        "posY": 80,
        "width": 176,
        "selected": false,
        "hovered": false
    },
```

```
    "propValues": {
        "hidePreview": false,
        "resize": {
            "width": -1,
            "height": -1
        },
        "resize,,,width": -1,
        "resize,,,height": -1
    },
    "incomingEdges": {
        "image": [
            {
                "sourceNodeId": "keywords_to_image_3gkkff",
                "outputId": "image"
            }
        ]
    }
},
{
    "id": "virtual_sticker_gowe99",
    "nodeSpecId": "virtual_sticker",
    "customData": {
        "rightOfNode": "",
        "previewX": 880,
        "previewY": 16,
        "previewWidth": 320,
        "previewHeight": 240
    },
    "uiData": {
        "posX": 896,
        "posY": 48,
        "width": 176,
        "selected": true,
        "hovered": false
    },
    "propValues": {
        "anchor": "faceTop",
        "scale": 1,
        "offsetX": 0,
        "offsetY": 0,
        "hidePreview": false
    },
    "incomingEdges": {
        "landmarkResult": [
            {
                "sourceNodeId": "face_landmark_bmctuv",
                "outputId": "landmarkResult"
            }
        ],
        "stickerImage": [
            {
                "sourceNodeId": "image_processor_jrkx8h",
                "outputId": "image"
            }
        ],
        "originalImage": [
            {
                "sourceNodeId": "live_camera_asvni3",
                "outputId": "image"
            }
        ]
    }
},
{
    "id": "image_viewer_vxmot5",
    "nodeSpecId": "image_viewer",
    "customData": {
        "previewX": 1152,
        "previewY": 0,
        "previewWidth": 320,
        "previewHeight": 240
    },
    "uiData": {
        "posX": 944,
        "posY": 512,
        "width": 176,
        "selected": false,
        "hovered": false
    },
```

-continued

```
        "propValues": {
            "columnCount": "2",
            "hidePreview": false
        },
        "inputValues": {
            "images": [ ],
            "urls": [ ]
        },
        "incomingEdges": {
            "images": [
                }
                    "sourceNodeId": "virtual_sticker_gowe99",
                    "outputId": "image"
                }
            ]
        }
    }
]
}
```

FIG. 3 depicts an example data flow for training (e.g., finetuning) a pseudocode drafting model (e.g., the pseudocode drafting model 2010 of FIG. 2) according to example embodiments of the present disclosure. The process shown in FIG. 3 can optionally be performed to improve the performance of the pseudocode drafting model.

The process shown in FIG. 3 can begin by obtaining a plurality of training tuples, such as training tuple 3002. The training tuple 3002 can include a natural language description 3004 and set of programming-language code 3006.

In one example, the programming-language code 3006 can be a set of code that is obtained from an existing code repository. The natural language description 3004 can then be generated for the code 3006. As one example, a human can be asked to review the code 3006 and to generate the natural language description 3004 that summarizes the operations and/or objectives of the code 3006. As another example, the programming-language code 3006 can be provided to a machine learning model such as a sequence processing model (e.g., a large language model). The machine learning model can generate the natural language description 3004 as its output.

As shown in FIG. 3, the programming-language code 3006 can be processed by an inverse compiler 3008 to generate a set of pseudocode 3010. For example, the inverse compiler 3008 can be the inverse of the compiler 95 discussed with reference to FIG. 1. For example, the compiler 95 discussed with reference to FIG. 1 can apply a set of rules to transform pseudocode into programming-language code. The inverse compiler 3008 can apply the inverse of these rules to transform (or "decompile") the set of programming-language code 3006 into the set of pseudocode 3010.

Also as shown in FIG. 3, the natural language description 3004 can be provided to the pseudocode drafting model 2010. As a result, the pseudocode drafting model 2010 can output a set of predicted pseudocode 3012. For example, the generation of the predicted pseudocode 3012 can occur similar to the process shown in FIG. 2.

A loss function 3014 can be evaluated. For example, the loss function 3014 can generate a loss value based on a comparison of the predicted pseudocode 3012 with the set of ground truth pseudocode 3010. As one example, the loss function 3014 can evaluate whether the predicted pseudocode 3012 contains the same sequence of tokens as the ground truth pseudocode 3010. As another example, additionally or alternatively, the loss function 3014 can evaluate whether the predicted pseudocode 3012 contains the same nodes as the ground truth pseudocode 3010. As another example, additionally or alternatively, the loss function 3014 can evaluate whether the predicted pseudocode 3012 contains the same number of nodes as the ground truth pseudocode 3010. As another example, additionally or alternatively, the loss function 3014 can evaluate whether the predicted pseudocode 3012 contains the same sequence nodes as the ground truth pseudocode 3010. Other attributes or metadata for the two sets of pseudocode 3012 and 3010 can be compared as well.

The pseudocode drafting model 2010 can be updated based on the loss function 3014. For example, the loss function 3014 can be backpropagated through the pseudocode drafting model 2010 to update one or more parameter values of one or more parameters of the pseudocode drafting model 2010.

Figure 4A:
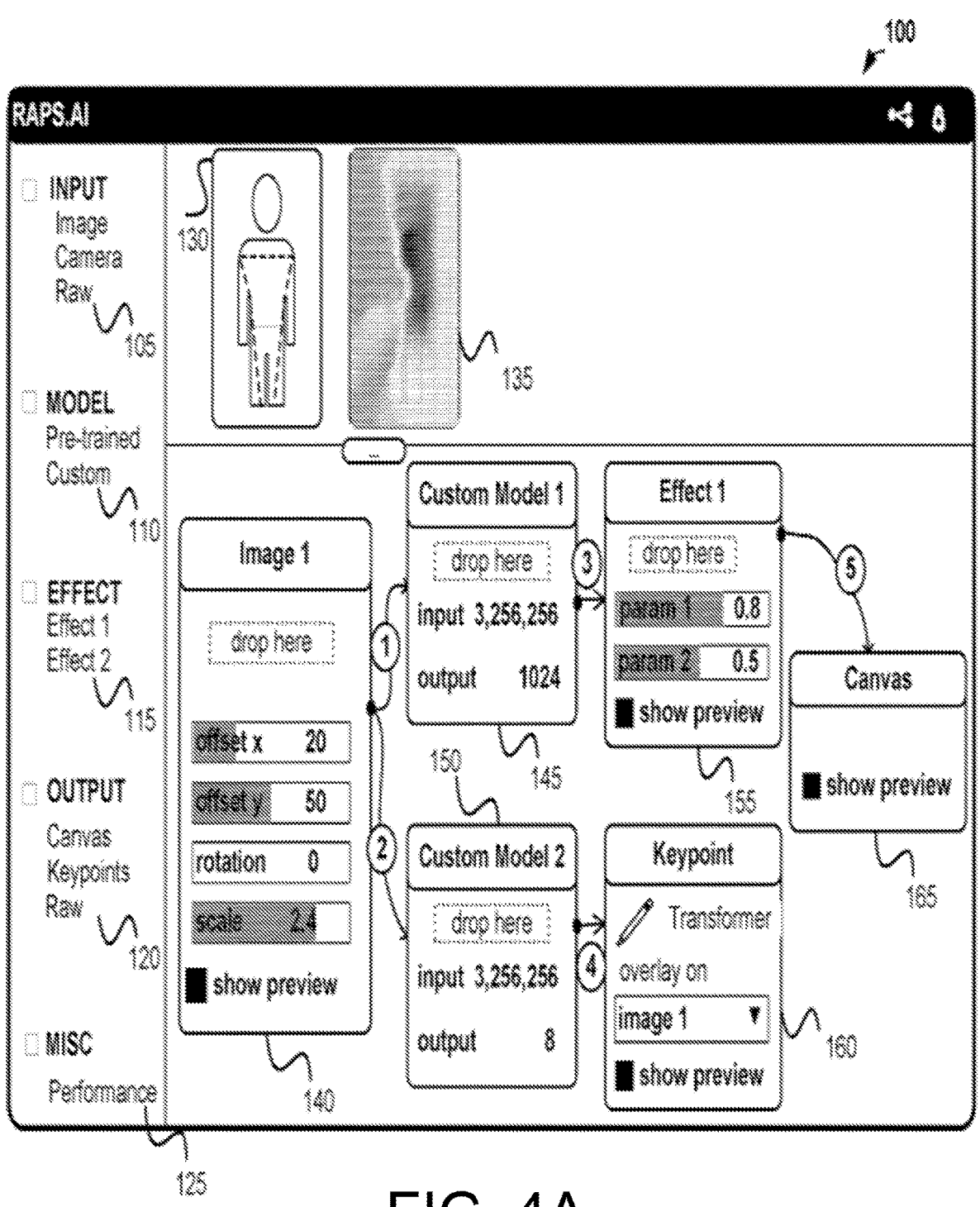
FIG. 4A is a diagram illustrating an example graphical user interface, in accordance with example embodiments.

FIG. 4A is a diagram illustrating an example graphical user interface (GUI) 100, in accordance with example embodiments. In some embodiments, an interactive graphical user interface may be provided that includes a first menu providing one or more input options, a second menu providing one or more machine learning models, and a third menu providing one or more output formats. For example, one portion of GUI 100 may include a library with a list of nodes grouped by different types that users may use to build a pipeline. The term "node" as used herein, generally refers to a component of a machine learning based pipeline. For example, the nodes may include input/output (I/O) nodes 105 (e.g., image from a camera, image from a library, raw image, etc.), various model types 110 (e.g., pre-trained, custom, etc.), effects 115, output options 120 (e.g., canvas, keypoints, raw, etc.), and miscellaneous items 125 (e.g., performance, etc.). The list may be configurable to add or remove additional and/or alternative nodes.

In some embodiments, a graph may be generated in a portion of interactive graphical user interface 100. For example, an example node-graph editor is illustrated that enables users to select one or more nodes to generate a node-graph. In some implementations, one or more user selections of an input option from the first menu, a machine learning model from the second menu, and an output format from the third menu may be detected. In some embodiments, the one or more user selections may include dragging and dropping an item from a menu into the portion of interactive graphical user interface 100. For example, a user may drag-and-drop, or tap-to-add, nodes to connect different inputs, deep learning models, graphical shaders, comparison modes, and so forth, as end-to-end pipelines.

For example, a first node, image 1 140, may be connected by edge 1 to a second node, custom model 1 145. In some embodiments, the generating of the graph further involves detecting another user selection of a second machine learning model from the second menu. Such embodiments involve, responsive to the other user selection, displaying, in the portion, a fourth node of the graph corresponding to the second machine learning model, a third edge of the graph connecting the first node to the fourth node, and a fourth edge of the graph connecting the fourth node to the third node. For example, first node, image 1 140, may be connected to second edge 2 to a third node, custom model 2 150. Custom model 1 145 may be connected by a third edge 3 to a fourth node, effect 1 155. Custom model 2 150 may be connected by a fourth edge 4 to a fifth node, keypoint 160. Also, for example, fourth node, effect 1 155, may be connected by fifth edge 5 to a sixth node, canvas 165. Such embodiments also involve applying the second machine learning model to the input to generate a second output in the output format. In such embodiments, the other user selection may include dragging and dropping the second machine learning model from the second menu into the portion of GUI 100. In such embodiments, the other user selection may include uploading the second machine learning model from a library of the user.

In some embodiments, first node, image 1 140, may include an option to edit one or more image characteristics. For example, first node, image 1 140, may include a portion (e.g., "drop here") where a user may upload an image. Some embodiments may involve receiving, by a second portion of the interactive graphical user interface, the input associated with the input option. For example, the image may be displayed in a portion of GUI 100 as image 130. Also, for example, first node, image 1 140, may include an option to edit an offset in the x-direction ("offset x"), an offset in the y-direction ("offset y"), an option to rotate ("rotate"), an option to scale the image ("scale"), and an option to display a preview of the image ("show preview"). In the example illustration, "offset x" is set to "20," "offset y" is set to "50," "rotate" is set to "0," and "scale" is set to "2.4."

Second node, custom model 1 145, and third node, custom model 2 150, may include a portion (e.g., "drop here") where a user may upload a machine learning model, and a number of inputs and outputs may be shown. Fourth node, effect 1 155, may include a portion (e.g., "drop here") where a user may upload a type of effect, and may adjust one or more parameters for the effect, such as a first parameter, "param 1" shown to be "0.8", a second parameter, "param 2" shown to be "0.5," and an option to display a preview based on updated parameter values ("show preview"). Fifth node, keypoint 160, may include an output format with an option to overlay an edited version over an input image. Some embodiments involve receiving, by a drop-down menu linked to the third node, the output in the output format. For example, one or more of the nodes, including output nodes, may be configured to include editable parameters, drop-down menus for additional user selections, and so forth.

In some embodiments, the graph is an editable graph. Such embodiments involve enabling a user to update the graph by performing one or more of adding, removing, or replacing a node, an edge, or both. Such embodiments also involve updating the output in substantial real-time based on an update to the graph. Canvas 165 may include an option to display a preview based on an updated node-graph ("show preview"). For example, output image 135 may be displayed, and real-time changes to output image 135 may be visible to a user of GUI 100 as the node-graph is generated (e.g., nodes and/or edges are added or deleted), and/or edited (e.g., edit each node, change a connecting edge between two nodes, and so forth).

GUI 100 enables users to connect different input options, different machine learning models, different graphical scenes, and/or different output formats within a node-graph editor. Users do not need to code to obtain the deployed application, and can generate the node-graph with user friendly selections. In some embodiments, the one or more user selections include dragging and dropping an item from a menu into the portion. For example, users can generate the node-graph by dragging-and-dropping some input nodes and machine learning models in an editable interface for GUI 100.

In some embodiments, the menu of input options may include input from common formats such as a webcam (e.g., select one from a list of webcams), upload a photo (e.g., with a drag-and-drop operation), provided a URL to fetch an online image, and so forth. In some embodiments, users may use preset images (e.g., copyright-free images for scene, portrait, object, etc.) as example input. Also, for example, users may "batch test" from a batch of images (e.g., up to the first 50 images in a scrolling view), or off-the-shelf datasets (e.g., by providing URLs to fetch a set of online images). As another example, users may use a microphone as a source for an input for specific machine learning models (e.g., denoising, transcription, and so forth). Also, for example, users may input text as an input for language models. In some embodiments, users may upload a video stream or provide an URL of an online video as input. Additional ways to add an input may include access to datasets via APIs.

Although one image is shown in the first node, image 1 140, users can optionally upload one or more images. In some displays, multiple images may be presented in a vertical scrolling list, while one image may be selected at a time. In some embodiments, a default mode may be set where the model node (e.g., second node 145) connected to the image node (e.g., first node 140) runs once for a currently selected image. In general, a user may have an option to run through an image sequence, and the output node (e.g., canvas 165) connected to the input node (e.g., first node 140) may display a list of results. In some embodiments, the scrolling down the vertical scrolling list may be synchronized. As indicated previously, as an alternative to uploading images, a user may optionally enter a URL pattern to fetch multiple images in a batch. For example, the user may select a starting index "0," and an ending index "10," to dynamically load a subset of eleven images from the entered URL pattern. Also, as described, images may be adjusted, including cropping, changing a contrast setting, brightness setting, and so forth. In some embodiments, effects such as shader effects, custom filters, and so forth may be applied.

In some embodiments, the user may have an option to upload an audio file, or a list of audio files. For example, instead of uploading images, the user may opt to enter a URL pattern to upload multiple audios. Also, for example, the user may have an option to run a model based on selected portions of the audio, and/or when the audio is played at a certain rate.

In some embodiments, the menu of output formats may enable a user to select one or more output formats. For example, users may visualize various outputs to fine-tune the model (e.g., identify situations where the model works well, and situations where the model needs improvement). In some embodiments, output nodes may receive an input from the input nodes, model nodes, effect nodes, and so forth, and serve as end points for the node-graph. In some embodiments, users may visualize results as labels (e.g., MobileNet), visualize results as landmarks (e.g., MoveNet), and so forth. Also, for example, users may visualize results as bounding boxes (e.g., object recognition), and/or as images (e.g., BodyPix, Geodesic PreServing Feature for Dense Human Correspondences (HumanGPS)).

In some embodiments, output nodes may receive an input from the input nodes, model nodes, effect nodes, and so forth, and may connect to comparison nodes. For example, two or more output nodes may be taken as input, and a side-by-side comparison may be produced.

The menu of machine learning models may include any model that may be configured to work within the pipeline. Machine learning models may include object recognition models (e.g., MobileNet v1, MobileNet v2, Coco SSD), object segmentation models (e.g., DeepLab v3), face landmarks detection models (e.g., BlazeFace), hand pose models (e.g., MediaPipe), body pose detection models (e.g., MoveNet, BlazePose, PoseNet), depth detection models (e.g., portrait depth, face depth), portrait segmentation models (e.g., Meet v1), semantics models (e.g., BodyPix, HumanGPS), text models (e.g., Lamda, Universal Sentence Encoder, Text Toxicity), audio models (e.g., Audio Recorder, Upload Audio), tensor flow (TF) models with type TF.js model, TF Lite model, custom TF model, image-to-image models (e.g., superresolution, stylization, depth estimation), image-to-point clouds models (e.g., 3D reconstruction models), and image-to-video models (e.g., animated photo generator), image to text label models (e.g., classification), and so forth.

In some embodiments, GUI 100 may be configured to enable ML researchers to drag-and-drop new inputs and/or models, and interactively change characteristics such as brightness, contrast, hue, saturation, and so forth, and test the model, compared with other model outputs side-by-side.

In some embodiments, GUI 100 may be configured to enable UX designers to directly comment on the ML pipeline, tune parameters (e.g., aspect ratio of input images, hyperparameters in ML models), and share positive and negative examples with recorded video and/or a screenshot.

In some embodiments, GUI 100 may be configured to enable UX researchers to distribute the application via uniform resource locator (URL) and collect user feedback with survey nodes.

In some embodiments, GUI 100 may be configured to enable end users to compile a minimized pipeline to deploy via a URL and run on compatible devices (e.g., Android, IOS™, WINDOWS™, MACBOOK™). For example, the pipeline may receive input from an input source (e.g., camera) and output to an end-user application (e.g., augmented reality (AR) glasses, virtual reality (VR) glasses, etc.). Also, for example, the pipeline may be configured to support streaming of rendered results directly from a device (e.g., laptop) to another device (e.g., AR glasses) via various communication interfaces (e.g., WiFi, Bluetooth, etc.).

In some aspects, the node-graph may be generated by dragging a node from the library, and dropping it into the editable portion of GUI 100. Also, for example, the nodes may be connected together to express dependencies and data flow. Based on the generated node-graph, the computing device may take the inputs, apply the machine learning models, and display the output in a panel of GUI 100 in real time. Some embodiments involve enabling a user to edit one or more parameters associated with one or more of the input, the machine learning model, or the output. Edits made in the node-graph may be reflected in the output without a need for code compilation, packaging, and/or redeployment. Accordingly, user may interact with GUI 100 in real time based on the node-graph.

In some embodiments, the node-graph may comprise a path from an input to a model inference to an output. However, more complex node-graphs may be generated. For example, the same input may be connected to two different models, and each model may be connected to different outputs. Accordingly, different models may be compared on the same input. After the pipeline has been generated, a demo of the model may be shared across devices. For example, selecting a "share" feature may generate a URL that may be provided to another user. The other user may use the URL to view the generated pipeline.

GUI 100 may be configured to support debugging edge cases and debugging in general. For example, users may interactively tune parameters on any node, images, video, and/or audio may be interactively adjusted. For example, the input image may be made darker, or an offset may be applied, to visualize an effect on model performance.

GUI 100 may be configured to support batch input and enable a comparison mode where outputs may be provided in a manner that enables users to easily discover problems in model performance. Also, for example, users may view intermediate results to determine specific steps in the node-graph pipeline that may be causing a problem.

Also, for example, GUI 100 may be configured so that users may annotate text on a node-graph canvas, or edit inputs and/or outputs. For example, users may annotate with circles and arrows on the node-graph canvas, or may annotate specific input and/or output images. In some embodiments, users may annotate free-line drawings on the node-graph canvas, or specific inputs and/or outputs. Users may also access the output in various formats, such as by downloading a "before/after" pair of images, a WebM of a video, a GIF of the video, and so forth.

Figure 4B:
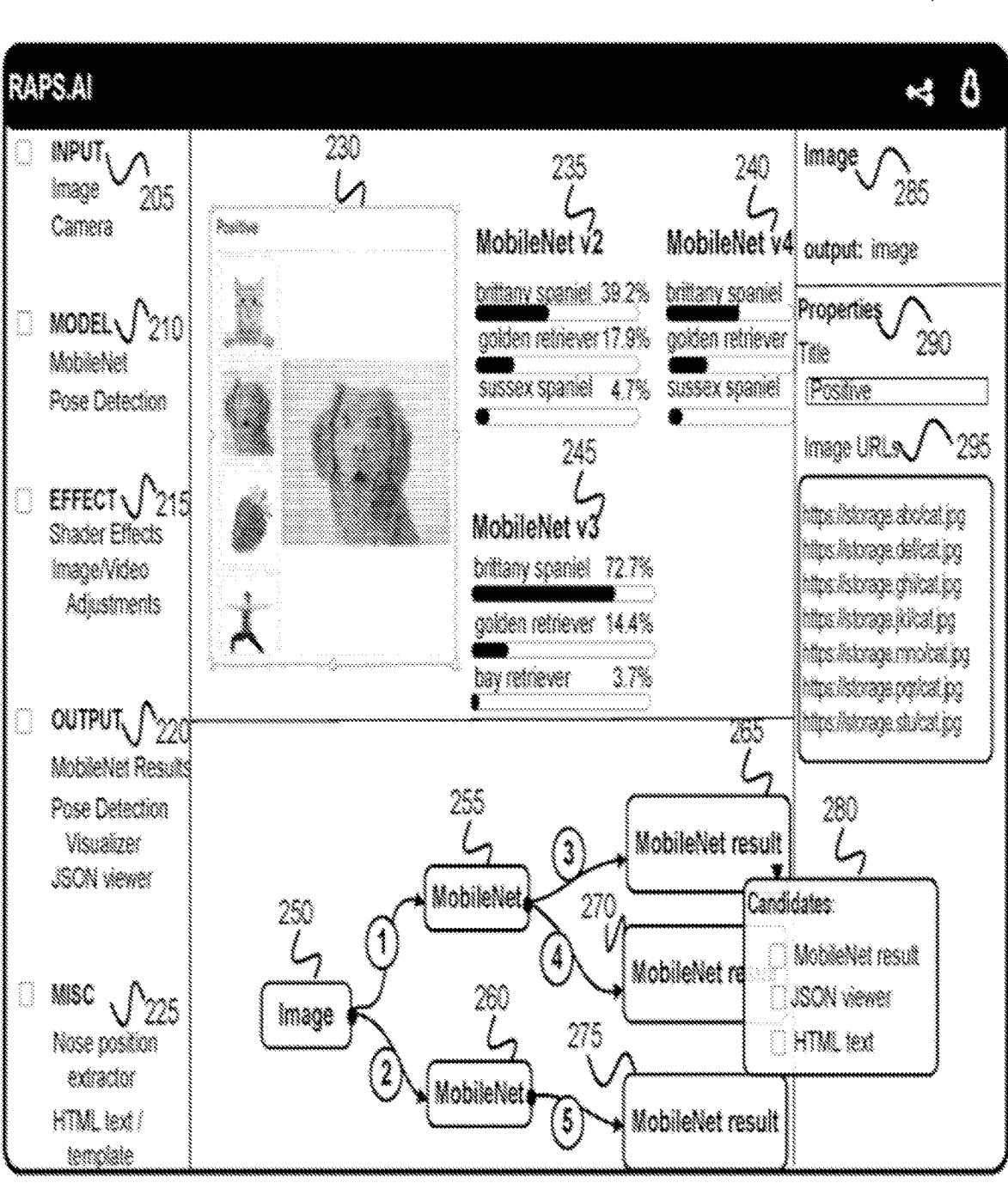
FIG. 4B is a diagram illustrating an example graphical user interface for a node-graph editor to compare multiple machine learning models, in accordance with example embodiments.

FIG. 4B is a diagram illustrating an example graphical user interface 200 for a node-graph editor to compare multiple machine learning models, in accordance with example embodiments. For example, GUI 200 may be configured to provide users with an option to interactively compare different versions of machine learning models in a node-graph editor.

In some embodiments, one portion of GUI 200 may include a library with a list of nodes grouped by different types that users may use to build a pipeline. For example, the nodes may include input/output (I/O) nodes 205 (e.g., image from a camera, image from a library, raw image, etc.), various model types 210 (e.g., MobileNet, pose detection, etc.), effects 215 (e.g., shader effects, image/video adjustments, etc.), output options 220 (e.g., MobileNet results, pose detection visualizer, JSON viewer, etc.), and miscellaneous items 225 (e.g., nose position extractor, HTML text, template, etc.). The image/video adjustments may include one or more user adjustable controls for translation, rotation, scaling, cropping, perspective transformation, shear mapping, adding noise, adding a user sketch, controlling brightness, adjusting hue, adjusting saturation, and so forth. The list may be configurable to add or remove additional and/or alternative nodes.

In some embodiments, a graph may be generated in a portion of interactive graphical user interface 200. For example, a node-graph editor is illustrated that enables users to select one or more nodes to generate a node-graph. For example, a first node, image 250, may be connected by edge 1 to a second node, first MobileNet model 255, and by a second edge 2 to a third node, second MobileNet model 260. First MobileNet model 255 may be connected by a third edge 3 to a fourth node, first MobileNet result 265. Some embodiments involve detecting another user selection of a second output format from the third menu. Such embodiments involve, responsive to the other user selection, displaying, in the portion, a fourth node of the graph corresponding to the second output format, and a third edge of the graph connecting the second node to the fourth node. For example, first MobileNet model 255 may be connected by a fourth edge 4 to a fifth node, second MobileNet result 270. Second MobileNet model 260 may be connected by a fifth edge 5 to a sixth node, third MobileNet result 275. In some embodiments, first MobileNet result 265 may include a drop-down menu 280 providing additional output options such as "MobileNet result," "JSON viewer," "HTML text," and so forth. Such embodiments also involve applying the machine learning model to the input to generate a second output in the second output format.

Images 230 may include a scrollable list of images, and a user may scroll down the list to select an image. For each selection made, input 250 may be reconfigured, and the node-graph may be run on the selected image. Results for each of the models may be displayed. For example, for the selected image 230 of a dog, the first model, MobileNet v2 235 may identify the dog as a "brittany spaniel" with a confidence score of "39.2%," as a "golden retriever" with a confidence score of "17.9%," and a "sussex spaniel" with a confidence score of "4.7%." For the same selected image 230 of a dog, the second model, MobileNet v4 240 may identify the dog as a "brittany spaniel" with a first confidence score, as a "golden retriever" with a second confidence score, and a "sussex spaniel" with a third confidence score. For the same selected image 230 of a dog, the third model, MobileNet v3 245 may identify the dog as a "brittany spaniel" with a confidence score of "72.7%," as a "golden retriever" with a confidence score of "14.4%," and a "sussex spaniel" with a confidence score of "3.7%." A side-by-side comparison of the confidence scores indicates that the third model, MobileNet v3 245, outperforms the other two models. The selected image 230 may be displayed as output image 285. One or more properties 290 of image 285 may be provided, such as, for example, a list of URLs 295 for the output images corresponding to input images 230.

As described, GUI 200 may be configured to enable users to compare results across different visualizations and dimensions, an ability to check the same result, and compare across different images. In some embodiments, comparison nodes may receive input from input nodes, model nodes, and so forth, and may be the end points of the node-graph. Users may have an ability to dynamically map inputs to different models and compare respective outputs. Users may have an ability to upload and/or provide URLs to fetch a set of ground truth images for comparison.

In some embodiments, a comparison node may be configured to generate peak signal-to-noise ratio (PSNR) scores, and/or structural similarity (SSIM) index compared to ground truth images. In some embodiments, a comparison node may be configured to sort the results based on their PSNR scores and/or SSIM index compared to the ground truth images. The PSNR scores and/or SSIM index generally indicate a measure of likeness of an output of a model to a ground truth image. A higher measure of likeness is indicative of a better performance for an image to image machine learning model.

In some embodiments, GUI 200 may be configured to enable users to share a demo via a URL. The demo links may be configured to be private, or public.

Figure 4C:
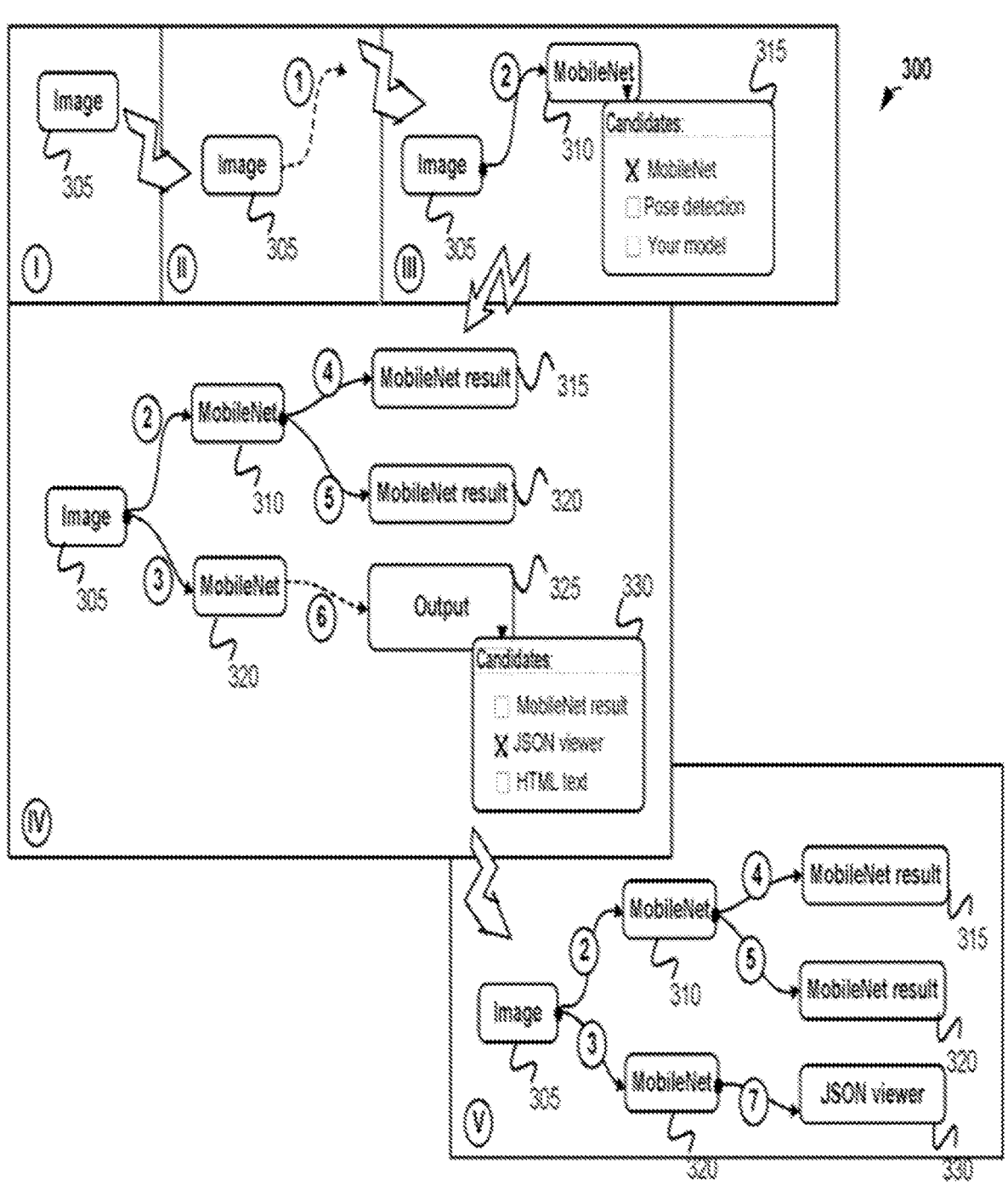
FIG. 4C illustrates an example interactive node-graph generation process, in accordance with example embodiments.

FIG. 4C illustrates an example interactive node-graph generation process 300, in accordance with example embodiments. At step I, the user may select an input option, such as an image. A corresponding node, image node 305, may be generated in a node-graph editor portion of an interactive graphical user interface. At step II, a linkable edge 1 may be displayed that can be configured to connect image node 305 to a next node. At step III, the user may select a machine learning model, such as MobileNet. A corresponding node, MobileNet node 310, may be generated in the node-graph editor portion of the interactive graphical user interface. Also, for example, linkable edge 1 may be transformed to a connected edge 2 that connects image node 305 to MobileNet node 310. In some embodiments, the displaying of the first edge is responsive to a user indication connecting the first node to the second node. For example, user may provide an indication to connect image node 305 to MobileNet node 310 (e.g., by dragging an end of linkable edge 1 to connect to MobileNet node 310), and the transforming of linkable edge 1 to connected edge 2 may occur in response to the user indication. Some embodiments involve providing the user with a selectable edge (e.g., linkable edge 1) that enables the user to confirm a connection of the first node to the second node. The displaying of the first edge (e.g., connected edge 2) is performed upon receiving user confirmation to connect the first node to the second node.

At step IV, additional nodes and/or edges may be added following the procedure described in step III. For example, image node 305 may be connected to MobileNet node 320 by connected edge 3, MobileNet node 310 may be connected to an output node, MobileNet result node 315, by connected edge 4, and to another output node, MobileNet result node 320, by connected edge 5. Also, for example, MobileNet node 320 may have a linkable edge 6 extend to output node 325. In some embodiments, output node 325 may be configured to provide a user with an ability to select from various options, such as "MobileNet result," "JSON viewer," or "HTML text," among others. As illustrated, the user may select from a drop-down menu of options, and may select an output format to be "JSON viewer." Accordingly, at step V, a node-graph is generated where output node 325 is replaced with JSON viewer node 330, and linkable edge 6 is replaced with connected edge 7.

In some embodiments, if a user attempts to connect two nodes that cannot be connected, node-graph generation process 300 may be configured to generate an error message indicating that the two nodes cannot be connected. Generally, two nodes may not be connected if their respective underlying executable codes cannot be pieced together for compilation and execution. Also, for example, node-graph generation process 300 may be configured to automatically generate a node graph based on an input node, or to provide one or more recommendation nodes and/or edges.

In some embodiments, the generating of the graph further involves predicting, by a trained graph predictive model, one or more of a next node or a next edge of the graph. Such embodiments involve recommending the one or more of the next node or the next edge to a user. For example, the recommendation may be based on a history of user preferences and/or user behavior. In some embodiments, the user preferences and/or user behavior may involve a plurality of users using the platform. Also, for example, the recommendation may be based on a next node that may be compatible with a current node. For example, if a current node is an image, a next node recommendation may include one or more image processing ML models. As another example, if a current node is an audio, a next node recommendation may include one or more audio processing ML models. Such embodiments may also involve training the graph predictive model based on a plurality of graphs deployed on a plurality of computing devices. For example, a type of machine learning model to be used for a given input may be provided as a recommendation. In some embodiments, the recommendation may be provided by adding a node in the node-graph editor interface.

In some embodiments, the predicting may be performed by a predictive model that is a logical or mathematical type construct operable to predict a future event or outcome based on historical facts or data. A predictive model is a categorical model if its predictive outcomes are categories (e.g., a class of inputs, a class of ML models, etc.). In some embodiments, a predictive model is considered a regression model if its predictive outcomes are numeric values (e.g., runtime predictions, values for various image characteristics to be used in model comparison). In some cases, output from a number of distinct predictive models can be combined to achieve predictions that can be more accurate to predictions provided by individual models. Such predictions can be further improved by selecting a specific subset of predictive models for combination from a set of available models. For example, a subset can include predictive models that are particularly well suited for processing certain types of data (e.g., images, or audio, or video). Subsets of predictive models, however, can be selected based on any number of suitable factors.

In some implementations, a predictive model can be constructed, or trained, using a training dataset in conjunction with a machine learning algorithm. Training datasets can include any number of training examples (e.g., tens, hundreds, thousands, or millions of examples) embodying a patterned occurrence. For example, predictions can be tailored to a particular user, and a training dataset may comprise the plurality of node-graphs generated by the user, user interactions with the interface, user selections of nodes, and so forth. Also, for example, training datasets may include user interactions and user behavior for a plurality of users of the described platform. Each training example can include a number of elements (for example, observed features) related to a known outcome (e.g., a category or a numeric value). In some examples, the observed feature(s) for each training example can be considered a feature vector. The dimensionality of a feature vector can be equal to, or less than, the number of observed features included therein.

Figure 4D:
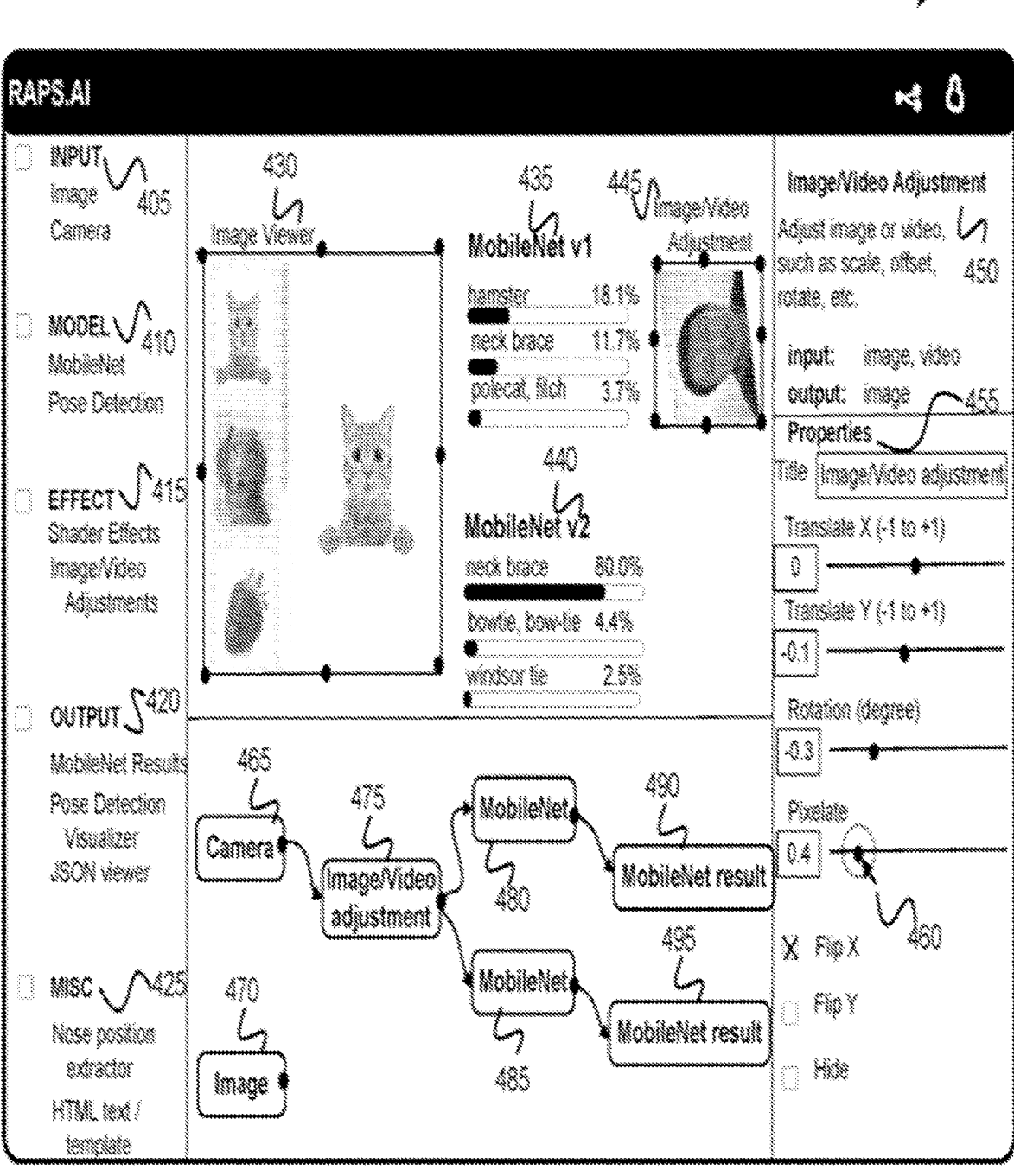
FIG. 4D is a diagram illustrating an example graphical user interface adjusting an input and comparing outputs of multiple machine learning models, in accordance with example embodiments.

FIG. 4D is a diagram illustrating an example graphical user interface 400 adjusting an input and comparing outputs of multiple machine learning models, in accordance with example embodiments. One portion of GUI 400 may include a library with a list of nodes grouped by different types that users may use to build a pipeline. For example, the nodes may include input/output (I/O) nodes 405 (e.g., image from a camera, image from a library, raw image, etc.), various model types 410 (e.g., MobileNet, pose detection, etc.), effects 415 (e.g., shader effects, image/video adjustments, etc.), output options 420 (e.g., MobileNet results, pose detection visualizer, JSON viewer, etc.), and miscellaneous items 425 (e.g., nose position extractor, HTML text, template, etc.). The list may be configurable to add or remove additional and/or alternative nodes.

In some embodiments, a graph may be generated in a portion of interactive graphical user interface 400. For example, a node-graph editor is illustrated that enables users to select one or more nodes to generate a node-graph. In some implementations, one or more user selections of an input option from the first menu, a machine learning model from the second menu, and an output format from the third menu may be detected. In some embodiments, the one or more user selections may include dragging and dropping an item from a menu into the portion of interactive graphical user interface 400. For example, a user may drag-and-drop, or tap-to-add, nodes to connect different inputs, deep learning models, graphical shaders, comparison modes, and so forth, as end-to-end pipelines.

For example, camera node 465 may be connected to image/video adjustment node 475, which may be connected to first MobileNet node 480 and second MobileNet model 485. First MobileNet node 480 may be connected to first MobileNet result node 490, and second MobileNet node 485 may be connected to second MobileNet result node 495. Users may also select an input and a corresponding input node 470 may be generated in the node-graph editor.

Images 430 may include a scrollable list of images from the selected input "camera" as indicated by camera node 465, and a user may scroll down the list to select an image.

Results for each of the models may be displayed. For example, results of MobileNet v1 435 are displayed for an object detection task. MobileNet v1 may correspond to first MobileNet node 480, and the results of MobileNet v1 435 may correspond to first MobileNet result node 490. Similarly, results of MobileNet v2 440 are displayed for the same object detection task. MobileNet v2 may correspond to second MobileNet node 485, and the results of MobileNet v2 440 may correspond to second MobileNet result node 495.

For example, a machine learning researcher may apply image/video adjustments 445 (e.g., rotation, scaling, offset) to a live image received from a web camera to test the robustness of the two models side-by-side in real time. The options for image/video adjustments 445 may be displayed when image/video adjustment node 475 is generated in the node-graph editor. The results 450 of the image/video adjustments 445 may be displayed. For example, the user may be provided with an indication to "adjust image or video, such as scale, offset, rotate, etc." and an indication that the input is an "image," or "video," and the output is an "image." One or more properties 455 may be displayed, such as horizontal bars with adjustable controls for a translation in the x direction, a translation in the y direction, a rotation (in degrees), a selectable option to flip the image, and so forth. For example, slider control 460 may be slid along the horizontal bar to adjust pixelate. Actual values for the image/video adjustments may be provided, enabling a user to perform side-by-side model comparisons and/or adjustments in real time.

A large variety of machine learning models, including face landmarks or super resolution denoising, and so forth may be supported. Also, for example, GUI 400 may be configured to be compatible with a "Colaboratory" (Colab) platform, such as Python colab, so that the processing may take place in the Colab and on the cloud server, and after processing, the results may be displayed in GUI 400.

Figure 5:
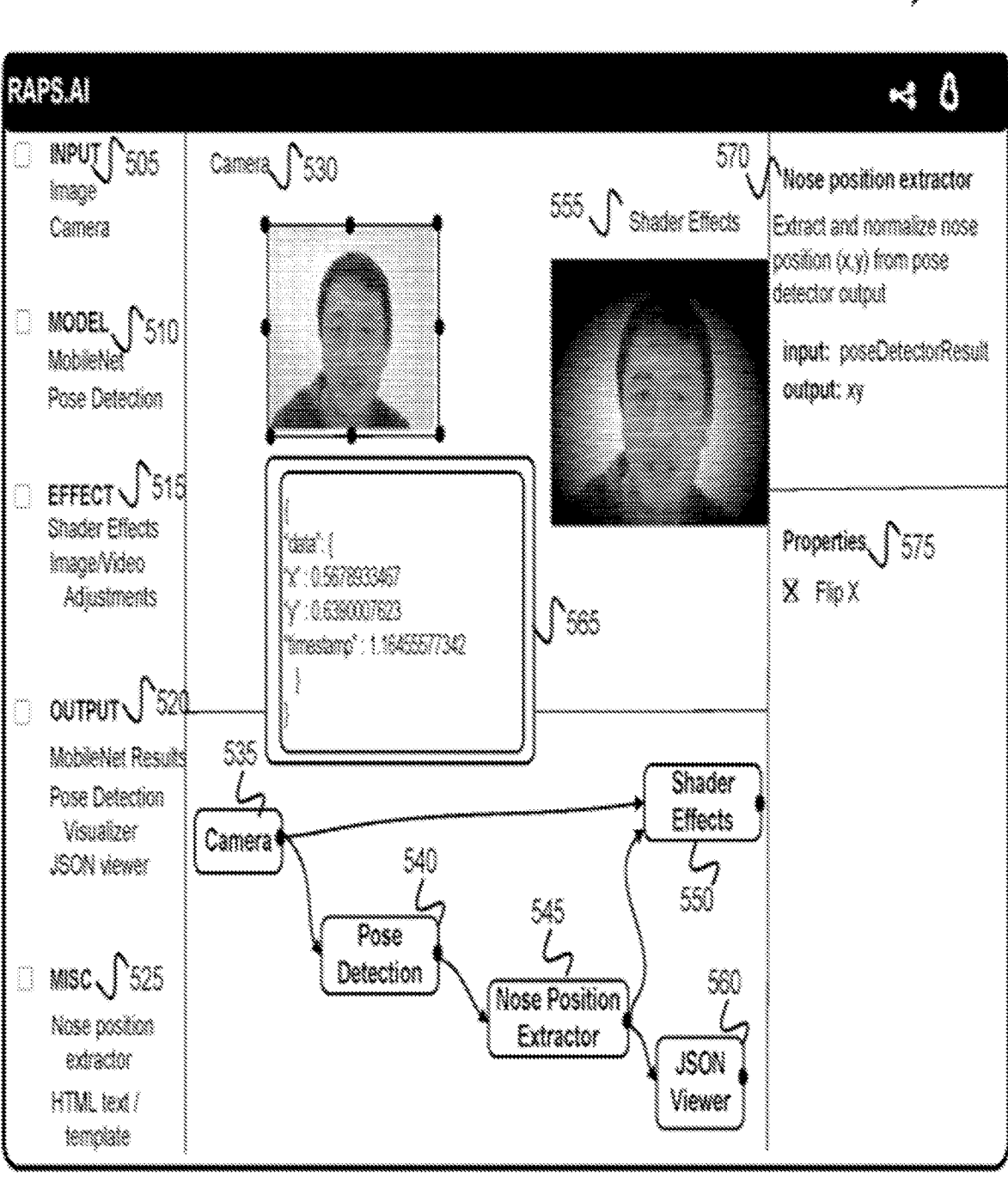
FIG. 5 is a diagram illustrating an example graphical user interface for interactively editing outputs of machine learning models, in accordance with example embodiments.

FIG. 5 is a diagram illustrating an example graphical user interface 500 for interactively editing outputs of machine learning models, in accordance with example embodiments. In some embodiments, one portion of GUI 500 may include a library with a list of nodes grouped by different types that users may use to build a pipeline. For example, the nodes may include input/output (I/O) nodes 505 (e.g., image from a camera, image from a library, raw image, etc.), various model types 510 (e.g., MobileNet, pose detection, etc.), effects 515 (e.g., shader effects, image/video adjustments, etc.), output options 520 (e.g., MobileNet results, pose detection visualizer, JSON viewer, etc.), and miscellaneous items 525 (e.g., nose position extractor, HTML text, template, etc.). The list may be configurable to add or remove additional and/or alternative nodes.

In some embodiments, a graph may be generated in a portion of interactive graphical user interface 500. For example, a node-graph editor is illustrated that enables users to select one or more nodes to generate a node-graph. For example, a camera node 535 may be connected to pose detection node 540, and to shader effects node 550. Pose detection node 540 may be connected to nose position extractor 545. And, nose position extractor 545 may be connected to shader effects node 550 and to JSON viewer node 560. Image 530 may be a live image from a webcam. A first ML model for pose detection may be applied, followed by a second ML model for a nose position extractor. Image 530 and an output of the nose position extractor may be displayed in the shader effects tool as image 555. A window 565 may be displayed corresponding to JSON viewer node 560. In some embodiments, window 565 may be used to edit data and/or make dynamic adjustments to the pipeline.

The results 570 of the nose position extractor node 545 may be displayed. For example, the user may be provided with an indication to "extract and normalize nose position (x, y) from pose detector output," and an indication that the input is a "pose detector result," and the output is "xy." One or more properties 575 may be displayed, such as a selectable option whether or not to flip the image over the x-axis ("Flip X").

The node-graph causes the shader pipeline to receive a tensor output from other machine learning models on the graphical processing unit (GPU), without shipping the data back and forth between CPU and the GPU to accelerate the computation. Users can visualize results of unconventional model outputs. For example, visual effects (VFX)/JS nodes may receive input from input nodes and model nodes, and may be configured to output to comparison or output nodes. In some embodiments, for VFX nodes, users may visualize results with shaders (e.g., Depth), and for JS nodes, users may visualize results with shaders and 3D scenes in a self-contained JS module (e.g., 3D photo, point clouds, meshes from depth map, and so forth). In some embodiments, the JS node may not allow a user to change scripts, but may enable some parameters to be edited interactively. In some embodiments, low-pass filter JS nodes for smoothing landmarks, and/or for generating bounding boxes in videos, may also be used in the node-graph. In some embodiments, users may interactively crop an input image, change an animation speed of a 3D scene in a video input, and/or deploy an output on other form-factor devices (e.g., wearable glasses, Android phones, and other wearable devices).

Figure 6:
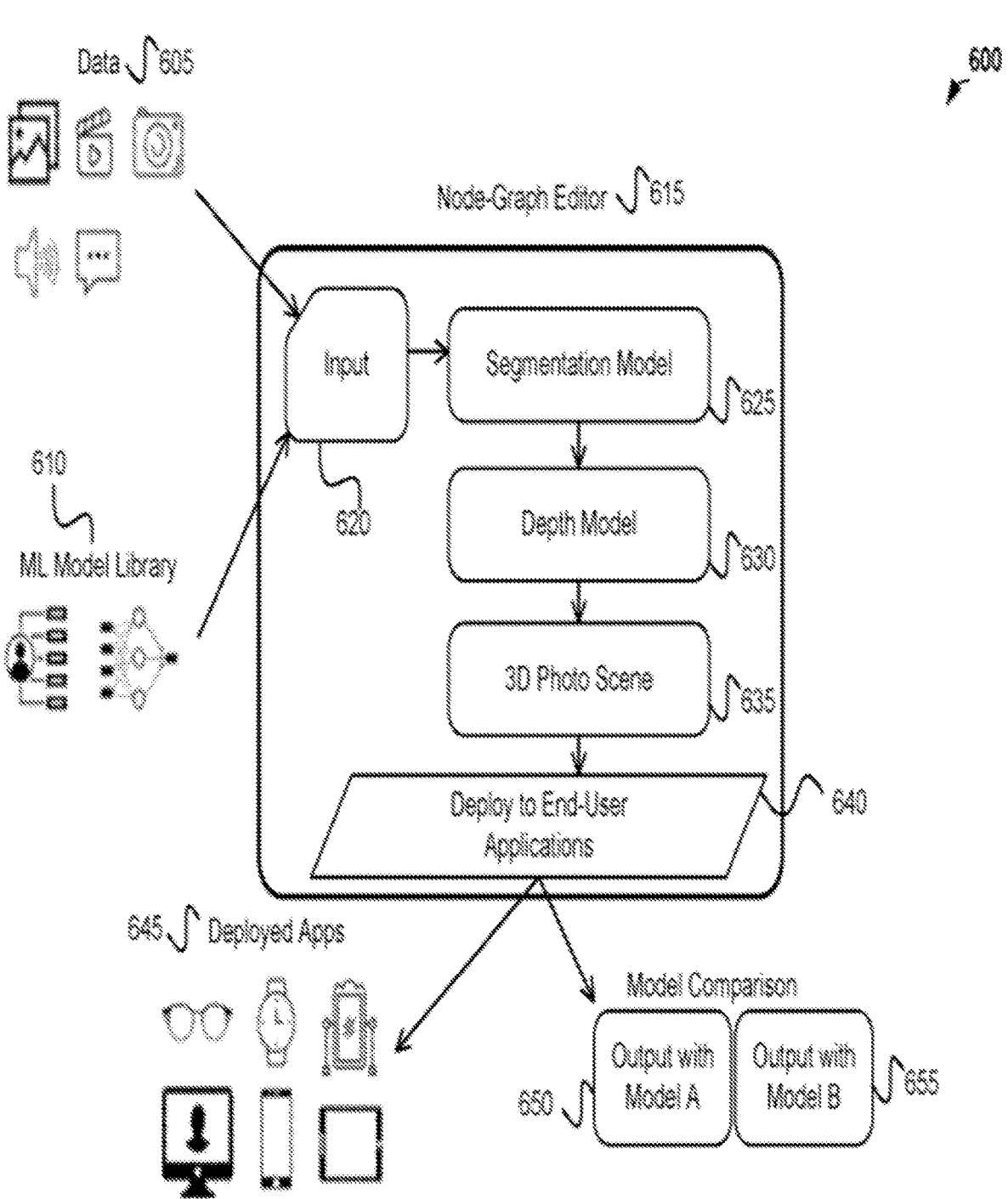
FIG. 6 is an example architecture for a rapid application prototyping system for artificial intelligence (RAPSAI), in accordance with example embodiments.

FIG. 6 is an example architecture for rapid application prototyping system for artificial intelligence (RAPSAI) 600, in accordance with example embodiments. Various system components and a high-level architecture of Rapsai 600 are illustrated. Rapsai 600 can be configured to provide developers and researchers input 620 in a variety of data formats 605, a comprehensive ML model library 610, for example, to drag-and-drop into node-graph editor 615, and connect different models and 3D graphics scenes. For example, segmentation model 625 can receive input 620, depth model 630 can receive output of segmentation model 625, 3D photo scene 635 can receive output from depth model 630, and the output from 3D photo scene 635 can be deployed at 640 to various end-user applications. For example, the output may be provided to deployed apps 645, and/or for model comparison of an output with model A 650 and an output with Model B 655. Data 605 may include a live image from a webcam, an image, video or audio from a library, HTML links to image, video, sound, etc., output of a microphone, a voice input by a user, and so forth. Deployed apps 645 can include wearable devices (e.g., watches, wearable glasses, headphones, etc.), computing devices (e.g., smartphone, laptop, desktop, mobile computing device, etc.). Rapsai 600 may directly deploy the app on cross-device applications via web applications, Bluetooth, and/or WiFi-based streaming over the Ethernet.

Accordingly, as described, a frictionless experience between Rapsai 600 and devices (e.g., Iris, TensorBoard, Coral, etc.) may be configured. For example, a depth modeling team can compare two depth models with newly uploaded images using a pre-made Rapsai graph. Rapsai 600 may be integrated into random cropping tools, tools for creating better data for testing, and so forth. Nodes may be configured to be extensible, allowing custom nodes to be created in a self-contained manner (e.g., no code changes are needed in the core stack for Rapsai 600). The pipeline editor may be injected into other applications as a web component, with well-defined input/output, and event APIs.

Figure 7:
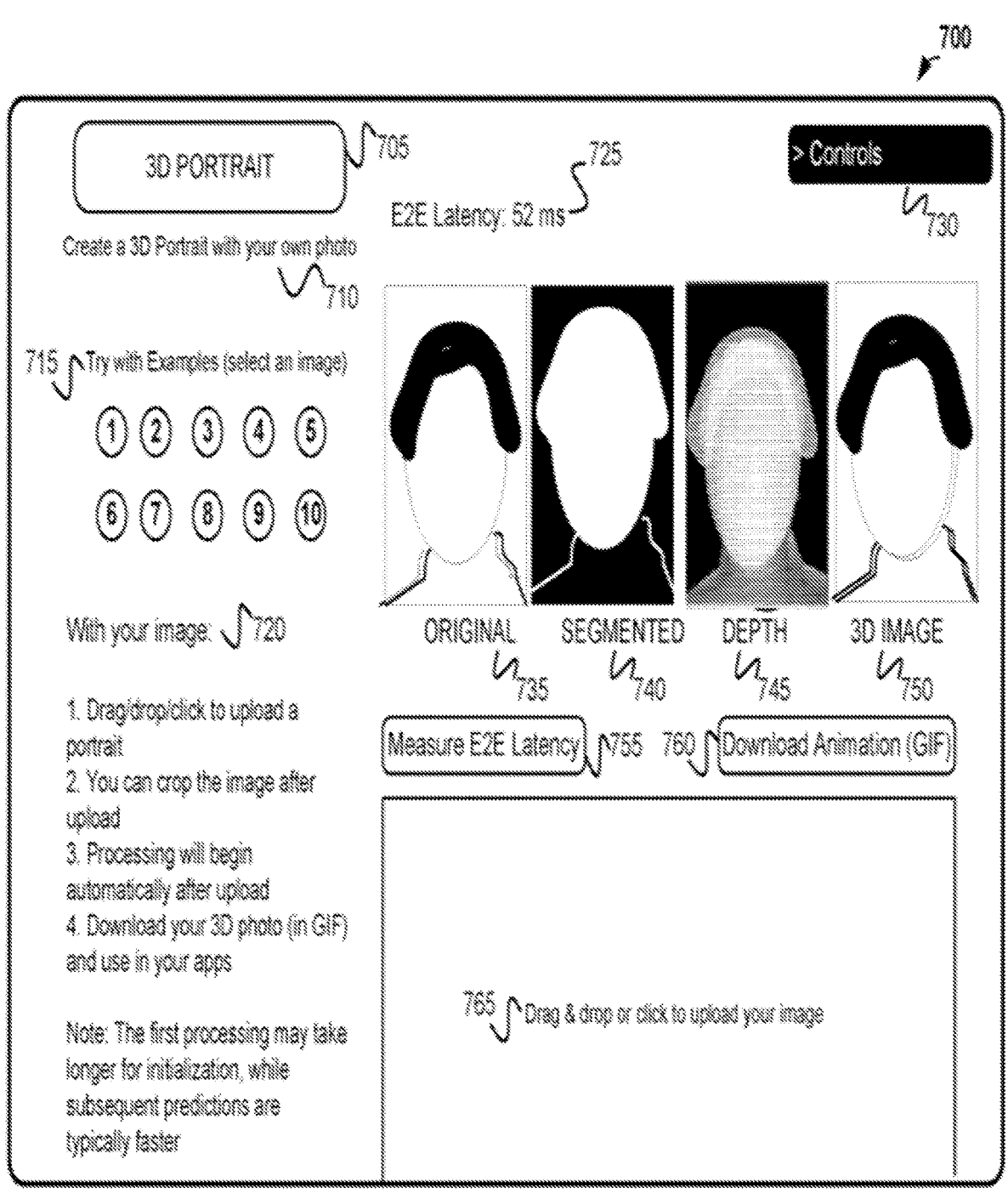
FIG. 7 is a diagram illustrating an example graphical user interface for an end-to-end node-graph editor with multiple machine learning models, in accordance with example embodiments.

FIG. 7 is a diagram illustrating an example graphical user interface for an end-to-end node-graph editor 700 with multiple machine learning models, in accordance with example embodiments. For example, a 3D portrait generator 705 is shown. In some embodiments, a caption 710 may be displayed, such as "create a 3D portrait with your own photo." The user may have an option to select from a plurality of available images 715. For example, images 715 may be displayed with a caption, "try with examples (select an image)." Also, for example, step-by-step instructions 720 may be provided for creating a 3D portrait, such as, for example, "1. Drag/drop/click to upload a portrait; 2. You can crop the image after upload; 3. Processing will begin automatically after upload; 4. Download your 3D photo (in GIF) and use it in your apps."

An image editor interface may be provided with a caption 765 to "drag and drop or click to upload your image." For example, a user may drag and drop images and select the image source to be a camera feed, or input image from another source. One or more machine learning models may be applied to the input image. For example, an original image 735 may be input to a segmentation model to generate segmented image 740. Segmented image 740 can be input to a depth estimation model to generate a depth image 745. Depth image 745 can be input into a 3D image generator model to generate 3D image 750. In some embodiments, end-to-end node-graph editor 700 may display an end-to-end (E2E) latency 725, provide one or more controls 730. Also, for example, end-to-end node-graph editor 700 may provide first virtual button 755 to enable users to measure the E2E latency. For example, when a user clicks first virtual button 755, end-to-end node-graph editor 700 may measure the E2E latency, and display it as E2E latency 725. Also, for example, second virtual button 760 may be provided to enable the user to download an animation (e.g., in GIF format).

An example deployment of Rapsai 600 may be for AR glasses. For example, given an uploaded profile photo and/or video stream from a webcam, Rapsai 600 pipeline can process a real-time selfie segmentation model 625, a depth estimation model 630, and then a 3D depth mesh scene 635, and can directly deploy the end results to AR glasses.

Rapsai 600 may be configured to enable users to utilize existing ML models (e.g., MoveNet, MobileNet, Selfie Segmentation), and/or new models. Also, for example, additional models such as TF.js models (e.g., Selfie Segmentation, MoveNet, MobileNet) may be accessed from various ML sources (e.g., from the TF Hub). In some embodiments, TF.js models and/or Tensorflow Lite Micro (TFLM) models may be added to node-graph editor 615 as ML nodes. Users may have an option to maintain privacy of the models, or to make them publicly available. Users may have an option to share models with other users. In some embodiments, a built-in cloud visualizer, or mesh visualizer can convert a 3D tensor output to an interactive rendering environment. Rapsai 600 may be configured to have the visualizer to change a view of the mesh, display a grid view, provide zooming in and zooming out features, and so forth.

Referring to FIGS. 6 and 7, as a node graph is generated (e.g., by a process described with reference to FIG. 4C) in node-graph editor 615, RAPSAI 600 automatically connects the respective pieces of executable code, and executes them, in the background. For example, if a first node corresponding to a camera input is selected, RAPSAI 600 applies code that enables RAPSAI 600 to connect to a webcam and retrieve a live image. Next, when a second node corresponding to segmentation model 625 is selected and connected to the first node, RAPSAI 600 automatically selects and applies executable code that enables RAPSAI 600 to receive the image from the webcam and input it to segmentation model 625. RAPSAI 600 also automatically runs segmentation model 625 on input 620 to generate an output of segmentation model 625 (e.g., segmented image 740 of FIG. 7).

Similarly, when a third node corresponding to depth model 630 is selected and connected to the second node, RAPSAI 600 automatically selects and applies executable code that enables RAPSAI 600 to receive the output of segmentation model 625 (e.g., segmented image 740 of FIG. 7), and input it to depth model 630. RAPSAI 600 also automatically runs depth model 630 on the output of segmentation model 625 (e.g., segmented image 740 of FIG. 7), to generate an output of depth model 630 (e.g., depth image 745 of FIG. 7).

Also, for example, when a fourth node corresponding to 3D photo scene 635 is selected and connected to the third node, RAPSAI 600 automatically selects and applies executable code that enables RAPSAI 600 to receive the output of depth model 630 (e.g., depth image 745 of FIG. 7), and input it to 3D photo scene 635. RAPSAI 600 also automatically runs 3D photo scene 635 on the output of depth model 630 (e.g., depth image 745 of FIG. 7), to generate an output of 3D photo scene 635 (e.g., 3D image 750 of FIG. 7).

Generally, RAPSAI 600 may be configured to automatically piece together pieces of executable code as a node-graph is generated in node-graph editor 615. As an edge is formed to connect two nodes, the respective pieces of underlying executable code are stitched together in real-time, compiled and executed. The executable code includes code with instructions to receive an input based on a selection from the menu of input options, instructions to provide the received input to one or more machine learning algorithms based on a selection from the menu of ML models, instructions to run the selected one or more ML models, instructions to generate an output based on a selection from the menu of output formats, and instructions to provide the generated output to an end-user application, or to other ML models, and so forth.

The infrastructure of RAPSAI 600 can be built on a multi-layered web-based system. Multiple web-based applications may be supported as plugins including plugins for graphics editors (e.g., Colab, Figma™), custom prototyping apps, standalone apps, and so forth, with a single pipeline. Also, for example, RAPSAI 600 can connect pre-post processing graphics libraries with machine learning models within the computation engine, and deploy to mobile devices (including AR glasses), browsers, node.js, and IoT devices.

Figure 8:
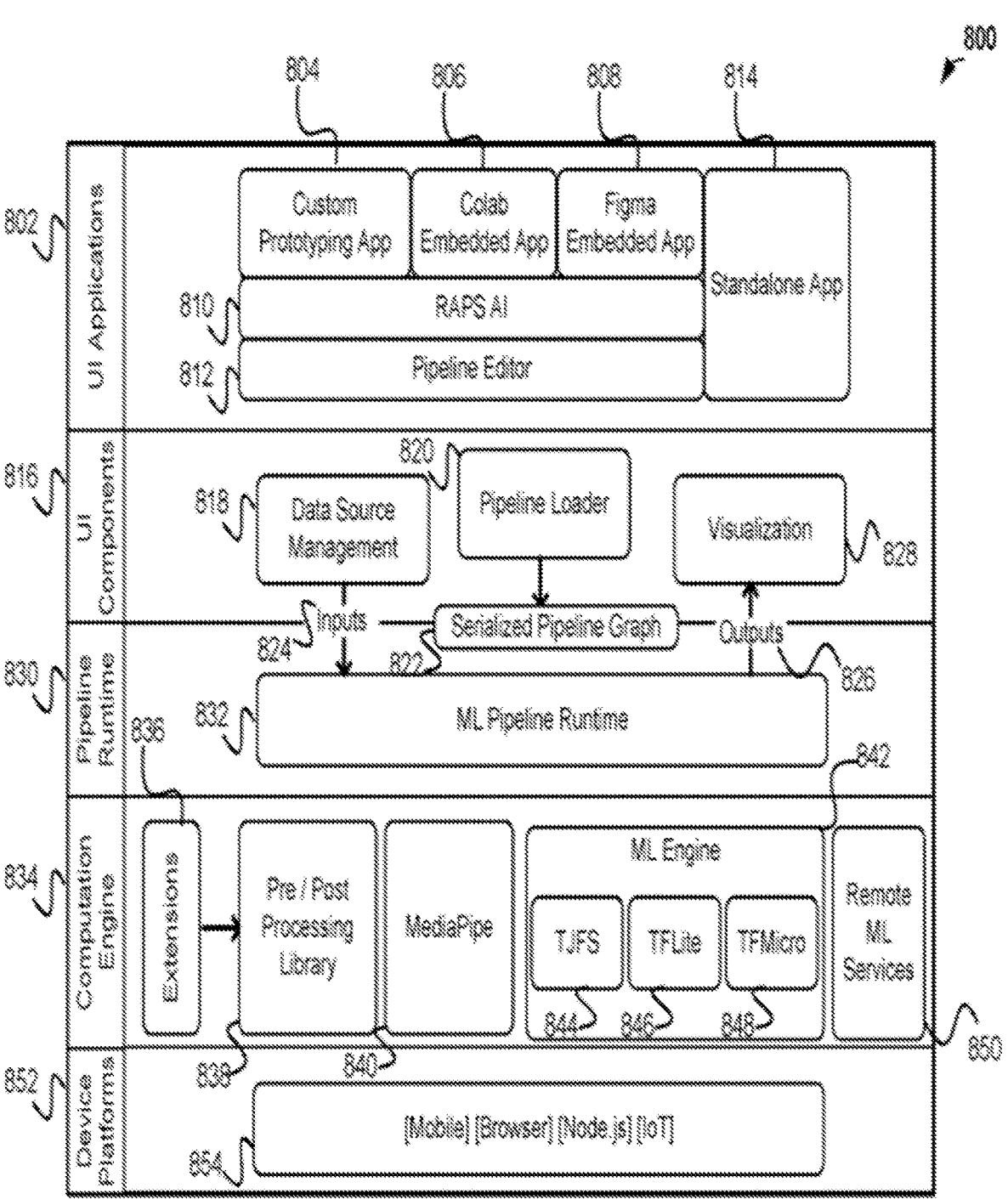
FIG. 8 is a schematic diagram illustrating an example unified prototyping platform, in accordance with example embodiments.

FIG. 8 is a schematic diagram illustrating an example unified prototyping platform 800, in accordance with example embodiments. For example, the RAPSAI system can provide a unifying AI prototyping experience. Generally, different teams may have different development processes, timelines, and/or deployment targets. For example, some teams may be targeting AR glasses, some teams may be targeting mobile phones, other teams may target website integration, and so forth, and each team may have different product life cycles. As described herein, RAPSAI system can be configured to provide a common platform for all the different teams. Prototyping platform 800 may be configured to have a multi-layered, flexible and extensible design. Prototyping platform 800 may be configured to run with various underlying ML engines and differing runtimes, and may be used as infra to build applications on top.

For example, ML researchers or developers may use prototyping platform 800 for comparing and performing data augmentation in real time. For example, for a given input image, the blurriness may be changed in real-time, or it may be cropped or resized, a brightness setting may be adjusted, and so forth, to test whether the machine learning models under test work for a portrait in bright sunshine. Also, for example, output images may be compared side-by-side to determine model performance. For example, a user may hover over an image (from a scrollable list of input images) and compare the respective outputs from a first model and a second model, or a first pipeline and a second pipeline, directly within the node-graph editor interface. As previously described with reference to FIG. 5, the pipeline may be tested on images from a live video stream. Existing techniques would require programmers to manually write executable code (e.g., Python code) to input a video and then process it using machine learning models. However, prototyping platform 800 enables a user to drag and drop or enable the web camera and select the camera, and view results from the ML models in real-time. Also, for example, by editing a node-graph in the node-graph editor, users may connect or disconnect nodes, create new pipelines, and test different models and/or multiple models with image/video adjustments, and so forth.

As illustrated in FIG. 8, a plurality of user interface (UI) applications 802 may be connected to the RAPSAI system, such as custom prototyping app 804, Colab embed app 806, Figma embed app 808, RAPSAI platform 810, pipeline editor 812 (e.g., node-graph editor), and standalone app 814. Also, for example, a plurality of UI components 816 may be provided, such as data source management 818, pipeline loader 820, and visualization 828. At pipeline runtime 830, inputs 824 from data source management 818 may be provided to ML pipeline runtime 832. Pipeline loader 820 may generate serialized pipeline graph 822 which is configured to manage ML pipeline runtime 832. Outputs 826 of ML pipeline runtime 832 are provided to visualization 826 for display.

Computation engine layer 834 may include components that enable pipeline runtime 830, such as, for example, extensions 836 (e.g., to connect to various inputs 824, ML models, etc.). Extensions 836 may be connected to pre- or post-processing library 838. In some embodiments, the interactive graphical user interface may be hosted on a platform, and shared across a plurality of computing devices. One or more of the generating of the graph, the applying of the machine learning model, or the providing of the output may be synchronized across the plurality of computing devices. For example, additional models that are utilized may include MediaPipe 840, ML engine 842, including TJFS 844, TFLite 846, and TFMicro 848. Additional and/or alternative sources of ML models may be used, such as remote ML services 850. Another layer may comprise device platforms 852 that may include one or more end-user application plugins, such as for mobile devices, browser applications, node.js, an internet of things (IoT) device, and so forth.

Figure 9:
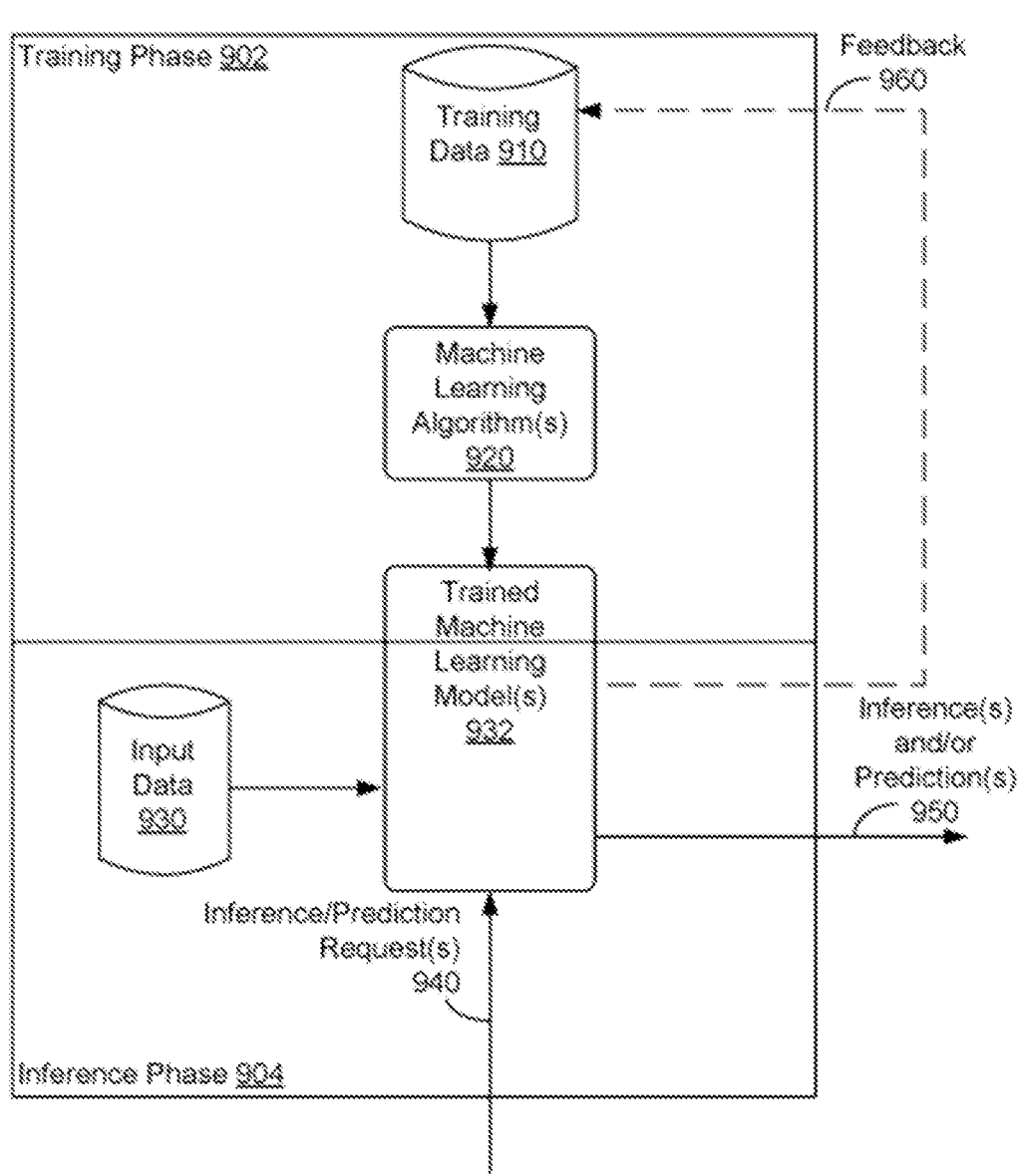
FIG. 9 is a diagram illustrating training and inference phases of a machine learning model, in accordance with example embodiments.

FIG. 9 shows diagram 900 illustrating a training phase 902 and an inference phase 904 of trained machine learning model(s) 932, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 9 shows training phase 902 where one or more machine learning algorithms 920 are being trained on training data 910 to become trained machine learning model(s) 932. Then, during inference phase 904, trained machine learning model(s) 932 can receive input data 930 and one or more inference/prediction requests 940 (perhaps as part of input data 930) and responsively provide as an output one or more inferences and/or prediction(s) 950.

As such, trained machine learning model(s) 932 can include one or more models of one or more machine learning algorithms 920. Machine learning algorithm(s) 920 may include, but are not limited to: an artificial neural network (e.g., a herein-described convolutional neural networks, a recurrent neural network, a Transformer neural network or other self-attention-based neural network, a Bayesian network, a hidden Markov model, a Markov decision process, a logistic regression function, a support vector machine, a suitable statistical machine learning algorithm, and/or a heuristic machine learning system). Machine learning algorithm(s) 920 may be supervised or unsupervised, and may implement any suitable combination of online and offline learning.

In some examples, machine learning algorithm(s) 920 and/or trained machine learning model(s) 932 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 920 and/or trained machine learning model(s) 932. In some examples, trained machine learning model(s) 932 can be trained, can reside on, and be executed, to provide inferences on a particular computing device, and/or otherwise can make inferences for the particular computing device.

During training phase 902, machine learning algorithm(s) 920 can be trained by providing at least training data 910 as training input using unsupervised, supervised, semi-supervised, and/or reinforcement learning techniques. Unsupervised learning involves providing a portion (or all) of training data 910 to machine learning algorithm(s) 920 and machine learning algorithm(s) 920 determining one or more output inferences based on the provided portion (or all) of training data 910. Supervised learning involves providing a portion of training data 910 to machine learning algorithm(s) 920, with machine learning algorithm(s) 920 determining one or more output inferences based on the provided portion of training data 910, and the output inference(s) are either accepted or corrected based on correct results associated with training data 910. In some examples, supervised learning of machine learning algorithm(s) 920 can be governed by a set of rules and/or a set of labels for the training input, and the set of rules and/or set of labels may be used to correct inferences of machine learning algorithm(s) 920.

Semi-supervised learning involves having correct results for part, but not all, of training data 910. During semi-supervised learning, supervised learning is used for a portion of training data 910 having correct results, and unsupervised learning is used for a portion of training data 910 not having correct results. Reinforcement learning involves machine learning algorithm(s) 920 receiving a reward signal regarding a prior inference, where the reward signal can be a numerical value. During reinforcement learning, machine learning algorithm(s) 920 can output an inference and receive a reward signal in response, where machine learning algorithm(s) 920 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 920 and/or trained machine learning model(s) 932 can be trained using other machine learning techniques, including but not limited to, incremental learning and curriculum learning.

In some examples, machine learning algorithm(s) 920 and/or trained machine learning model(s) 932 can use transfer learning techniques. For example, transfer learning techniques can involve trained machine learning model(s) 932 being pre-trained on one set of data and additionally trained using training data 910. More particularly, machine learning algorithm(s) 920 can be pre-trained on data from one or more computing devices and a resulting trained machine learning model provided to computing device CD1, where CD1 is intended to execute the trained machine learning model during inference phase 904. Then, during training phase 902, the pre-trained machine learning model can be additionally trained using training data 910, where training data 910 can be derived from kernel and non-kernel data of computing device CD1. This further training of the machine learning algorithm(s) 920 and/or the pre-trained machine learning model using training data 910 of CD1's data can be performed using either supervised or unsupervised learning. Once machine learning algorithm(s) 920 and/or the pre-trained machine learning model has been trained on at least training data 910, training phase 902 can be completed. The trained resulting machine learning model can be utilized as at least one of trained machine learning model(s) 932.

In particular, once training phase 902 has been completed, trained machine learning model(s) 932 can be provided to a computing device, if not already on the computing device. Inference phase 904 can begin after trained machine learning model(s) 932 are provided to computing device CD1.

During inference phase 904, trained machine learning model(s) 932 can receive input data 930 and generate and output one or more corresponding inferences and/or prediction(s) 950 about input data 930. As such, input data 930 can be used as an input to trained machine learning model(s) 932 for providing corresponding inference(s) and/or prediction(s) 950 to kernel components and non-kernel components. For example, trained machine learning model(s) 932 can generate inference(s) and/or prediction(s) 950 in response to one or more inference/prediction requests 940. In some examples, trained machine learning model(s) 932 can be executed by a portion of other software. For example, trained machine learning model(s) 932 can be executed by an inference or prediction daemon to be readily available to provide inferences and/or predictions upon request. Input data 930 can include data from computing device CD1 executing trained machine learning model(s) 932 and/or input data from one or more computing devices other than CD1.

Input data 930 can include training data described herein, such as user interaction data with the described interface, including user data from a plurality of users, devices, platforms, inputs, and so forth. Other types of input data are possible as well.

Inference(s) and/or prediction(s) 950 can include task outputs, numerical values, and/or other output data produced by trained machine learning model(s) 932 operating on input data 930 (and training data 910). In some examples, trained machine learning model(s) 932 can use output inference(s) and/or prediction(s) 950 as input feedback 960. Trained machine learning model(s) 932 can also rely on past inferences as inputs for generating new inferences.

After training, the trained version of the neural network can be an example of trained machine learning model(s) 932. In this approach, an example of the one or more inference/prediction request(s) 940 can be a request to predict a node, edge, parameter, input, output format, and so forth and a corresponding example of inferences and/or prediction(s) 950 can be a predicted node, edge, parameter, input, output format, and so forth.

In some examples, one computing device CD_SOLO can include the trained version of the neural network, perhaps after training. Then, computing device CD_SOLO can receive a request to predict a node, edge, parameter, input, output format, and so forth, and use the trained version of the neural network to predict the node, edge, parameter, input, output format, and so forth.

In some examples, two or more computing devices CD_CLI and CD_SRV can be used to provide output; e.g., a first computing device CD_CLI can generate and send requests to predict a node, edge, parameter, input, output format, and so forth to a second computing device CD_SRV. Then, CD_SRV can use the trained version of the neural network, to predict the node, edge, parameter, input, output format, and so forth, and respond to the requests from CD_CLI. Then, upon reception of responses to the requests, CD_CLI can provide the requested output (e.g., using a user interface and/or a display, a printed copy, an electronic communication, etc.).

Figure 10:
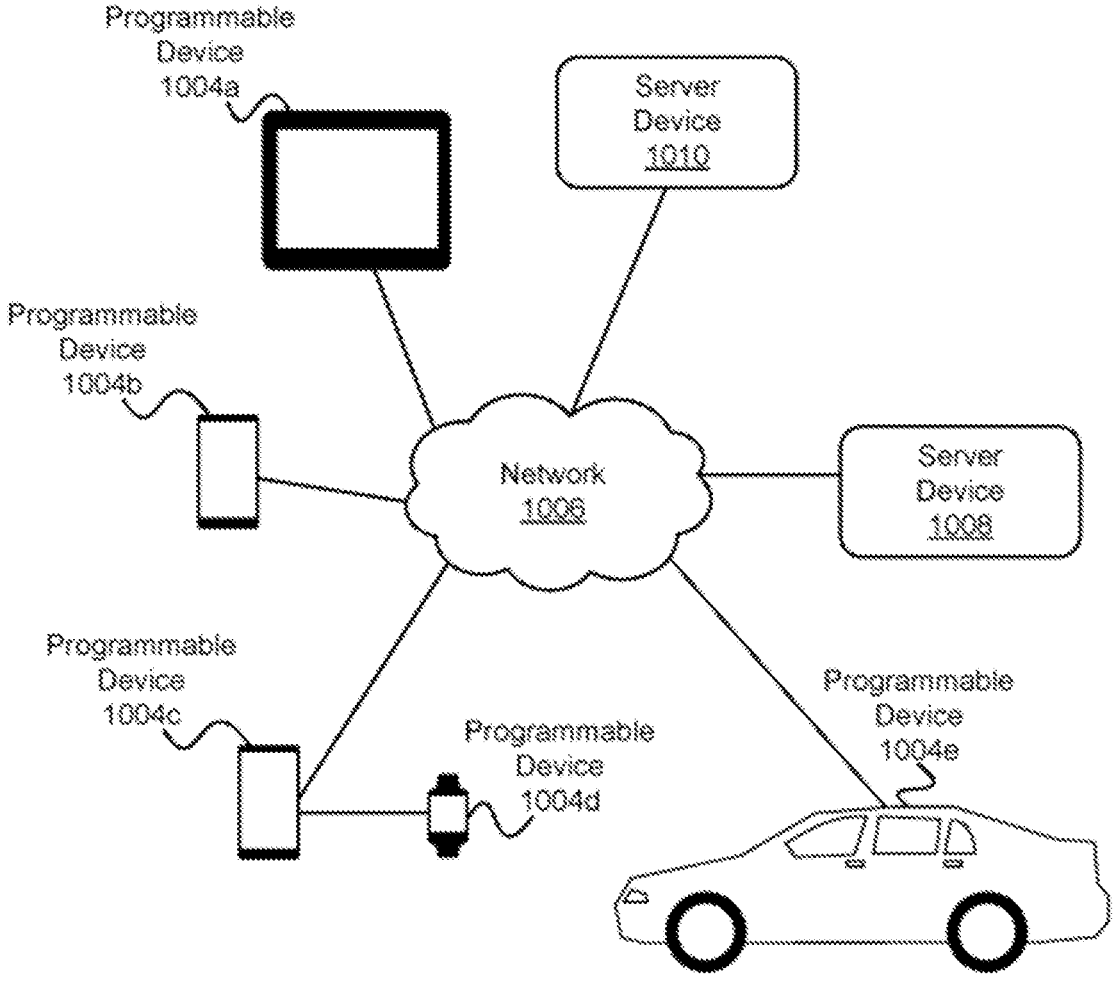
FIG. 10 depicts a distributed computing architecture, in accordance with example embodiments.

FIG. 10 depicts a distributed computing architecture 1000, in accordance with example embodiments. Distributed computing architecture 1000 includes server devices 1008, 1010 that are configured to communicate, via network 1006, with programmable devices 1004a, 1004b, 1004c. 1004d, 1004c. Network 1006 may correspond to a local area network (LAN), a wide area network (WAN), a WLAN, a WWAN, a corporate intranet, the public Internet, or any other type of network configured to provide a communications path between networked computing devices. Network 1006 may also correspond to a combination of one or more LANs, WANs, corporate intranets, and/or the public Internet.

Although FIG. 10 only shows five programmable devices, distributed application architectures may serve tens, hundreds, or thousands of programmable devices. Moreover, programmable devices 1004a, 1004b, 1004c, 1004d, 1004c (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1004a, 1004b, 1004c. 1004e, programmable devices can be directly connected to network 1006. In other examples, such as illustrated by programmable device 1004d, programmable devices can be indirectly connected to network 1006 via an associated computing device, such as programmable device 1004c. In this example, programmable device 1004c can act as an associated computing device to pass electronic communications between programmable device 1004d and network 1006. In other examples, such as illustrated by programmable device 1004c, a computing device can be part of and/or inside a vehicle, such as a car, a truck, a bus, a boat or ship, an airplane, etc. In other examples not shown in FIG. 10, a programmable device can be both directly and indirectly connected to network 1006.

Server devices 1008, 1010 can be configured to perform one or more services, as requested by programmable devices 1004a-1004c. For example, server device 1008 and/or 1010 can provide content to programmable devices 1004a-1004c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1008 and/or 1010 can provide programmable devices 1004a-1004e with access to software for database, search, computation, graphical, audio, video, World Wide Web/Internet utilization, and/or other functions. Many other examples of server devices are possible as well.

Figure 11:
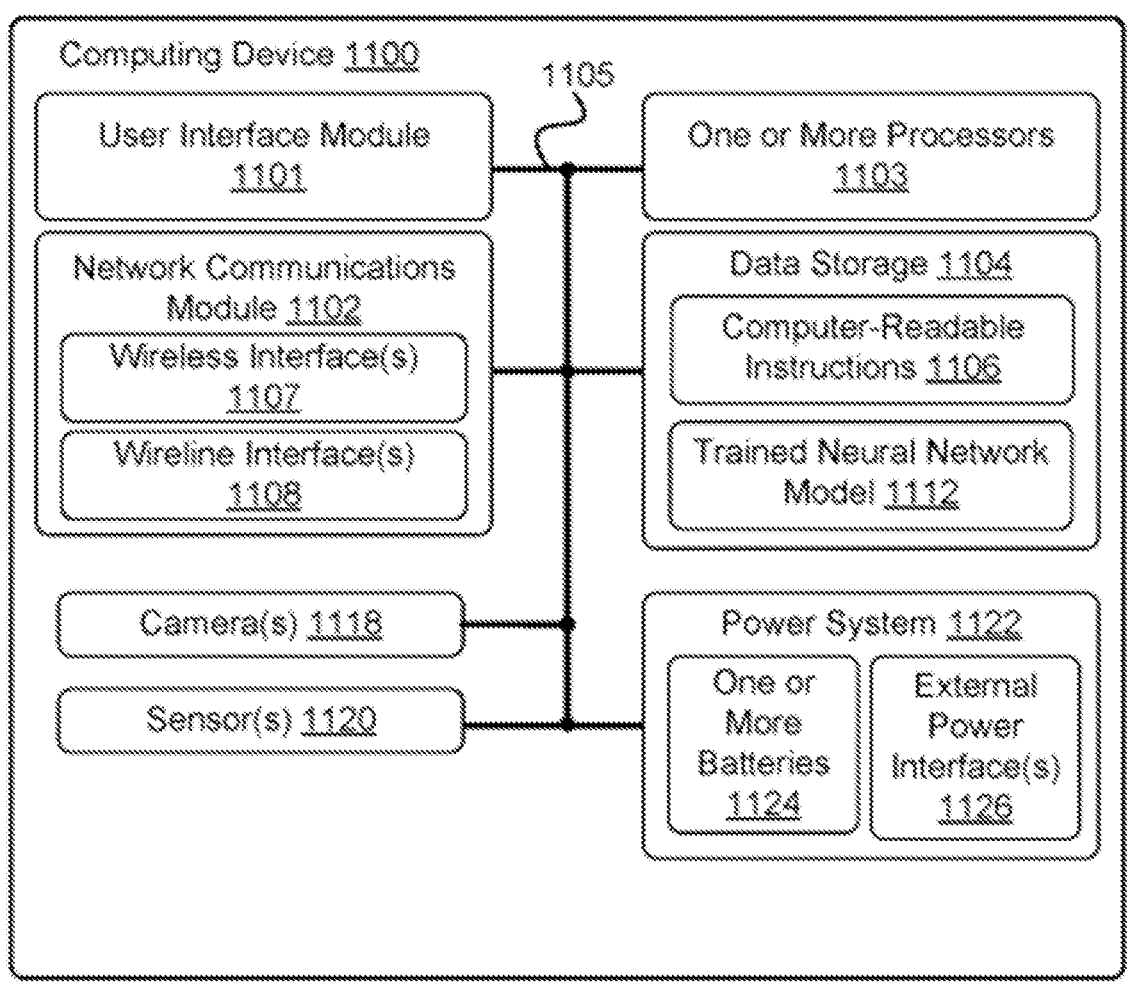
FIG. 11 is a block diagram of a computing device, in accordance with example embodiments.

FIG. 11 is a block diagram of an example computing device 1100, in accordance with example embodiments. In particular, computing device 1100 shown in FIG. 11 can be configured to perform at least one function of and/or related to neural network 100, and/or method 1100.

Computing device 1100 may include a user interface module 1101, a network communications module 1102, one or more processors 1103, data storage 1104, one or more camera(s) 1118, one or more sensors 1120, and power system 1122, all of which may be linked together via a system bus, network, or other connection mechanism 1105.

User interface module 1101 can be operable to send data to and/or receive data from external user input/output devices. For example, user interface module 1101 can be configured to send and/or receive data to and/or from user input devices such as a touch screen, a computer mouse, a keyboard, a keypad, a touch pad, a trackball, a joystick, a voice recognition module, and/or other similar devices. User interface module 1101 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1101 can also be configured to generate audible outputs, with devices such as a speaker, speaker jack, audio output port, audio output device, earphones, and/or other similar devices. User interface module 1101 can further be configured with one or more haptic devices that can generate haptic outputs, such as vibrations and/or other outputs detectable by touch and/or physical contact with computing device 1100. In some examples, user interface module 1101 can be used to provide a graphical user interface (GUI) for utilizing computing device 1100, such as, for example, a graphical user interface of a mobile phone device.

Network communications module 1102 can include one or more devices that provide one or more wireless interface(s) 1107 and/or one or more wireline interface(s) 1108 that are configurable to communicate via a network. Wireless interface(s) 1107 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1108 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1102 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1103 can include one or more general purpose processors, and/or one or more special purpose processors (e.g., digital signal processors, tensor processing units (TPUs), graphics processing units (GPUs), application specific integrated circuits, etc.). One or more processors 1103 can be configured to execute computer-readable instructions 1106 that are contained in data storage 1104 and/or other instructions as described herein.

Data storage 1104 can include one or more non-transitory computer-readable storage media that can be read and/or accessed by at least one of one or more processors 1103. The one or more computer-readable storage media can include volatile and/or non-volatile storage components, such as optical, magnetic, organic or other memory or disc storage, which can be integrated in whole or in part with at least one of one or more processors 1103. In some examples, data storage 1104 can be implemented using a single physical device (e.g., one optical, magnetic, organic or other memory or disc storage unit), while in other examples, data storage 1104 can be implemented using two or more physical devices.

Data storage 1104 can include computer-readable instructions 1106 and perhaps additional data. In some examples, data storage 1104 can include storage required to perform at least part of the herein-described methods, scenarios, and techniques and/or at least part of the functionality of the herein-described devices and networks. In some examples, data storage 1104 can include storage for a trained neural network model 1112 (e.g., a model of trained neural networks such as neural network 100). In particular of these examples, computer-readable instructions 1106 can include instructions that, when executed by one or more processors 1103, enable computing device 1100 to provide for some or all of the functionality of trained neural network model 1112.

In some examples, computing device 1100 can include one or more camera(s) 1118. Camera(s) 1118 can include one or more image capture devices, such as still and/or video cameras, equipped to capture light and record the captured light in one or more images; that is, camera(s) 1118 can generate image(s) of captured light. The one or more images can be one or more still images and/or one or more images utilized in video imagery. Camera(s) 1118 can capture light and/or electromagnetic radiation emitted as visible light, infrared radiation, ultraviolet light, and/or as one or more other frequencies of light.

In some examples, computing device 1100 can include one or more sensors 1120. Sensors 1120 can be configured to measure conditions within computing device 1100 and/or conditions in an environment of computing device 1100 and provide data about these conditions. For example, sensors 1120 can include one or more of: (i) sensors for obtaining data about computing device 1100, such as, but not limited to, a thermometer for measuring a temperature of computing device 1100, a battery sensor for measuring power of one or more batteries of power system 1122, and/or other sensors measuring conditions of computing device 1100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1100, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1100, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1100, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1120 are possible as well.

Power system 1122 can include one or more batteries 1124 and/or one or more external power interfaces 1126 for providing electrical power to computing device 1100. Each battery of the one or more batteries 1124 can, when electrically coupled to the computing device 1100, act as a source of stored electrical power for computing device 1100. One or more batteries 1124 of power system 1122 can be configured to be portable. Some or all of one or more batteries 1124 can be readily removable from computing device 1100. In other examples, some or all of one or more batteries 1124 can be internal to computing device 1100, and so may not be readily removable from computing device 1100. Some or all of one or more batteries 1124 can be rechargeable. For example, a rechargeable battery can be recharged via a wired connection between the battery and another power supply, such as by one or more power supplies that are external to computing device 1100 and connected to computing device 1100 via the one or more external power interfaces. In other examples, some or all of one or more batteries 1124 can be non-rechargeable batteries.

One or more external power interfaces 1126 of power system 1122 can include one or more wired-power interfaces, such as a USB cable and/or a power cord, that enable wired electrical power connections to one or more power supplies that are external to computing device 1100. One or more external power interfaces 1126 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1126, computing device 1100 can draw electrical power from the external power source the established electrical power connection. In some examples, power system 1122 can include related sensors, such as battery sensors associated with the one or more batteries or other types of electrical power sensors.

Figure 12:
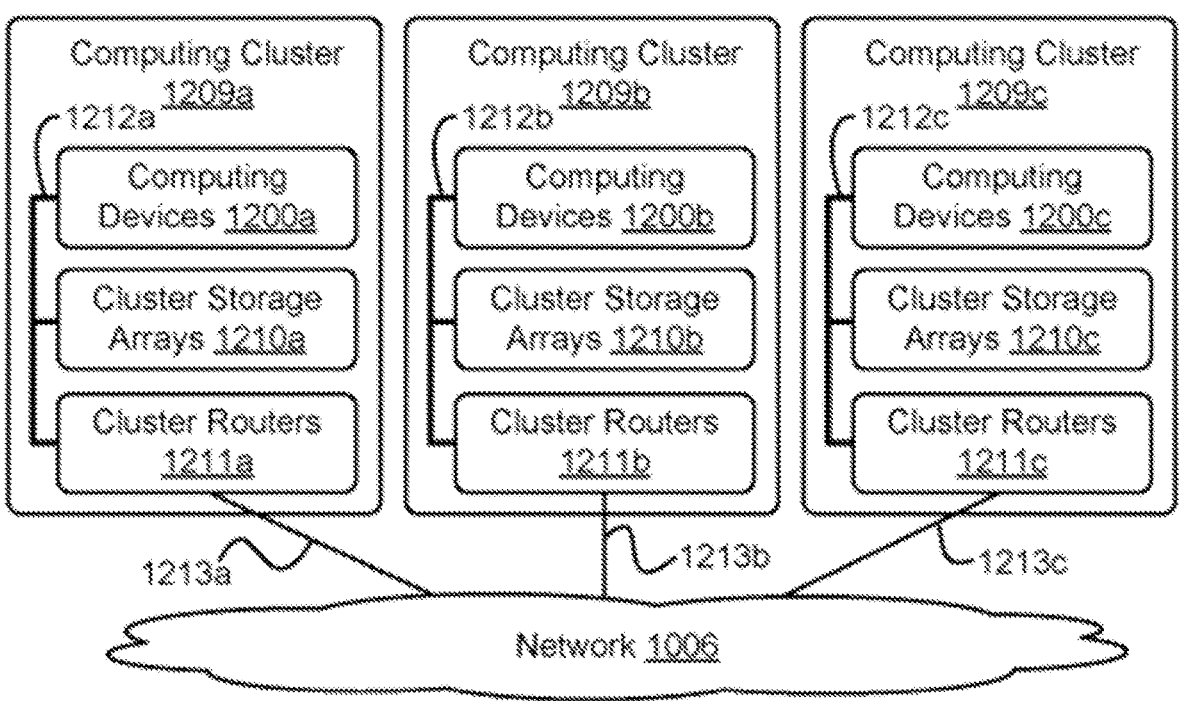
FIG. 12 depicts a network of computing clusters arranged as a cloud-based server system, in accordance with example embodiments.

FIG. 12 depicts a cloud-based server system in accordance with an example embodiment. In FIG. 12, functionality of a neural network, and/or a computing device can be distributed among computing clusters 1209a, 1209b, 1209c. Computing cluster 1209a can include one or more computing devices 1200a, cluster storage arrays 1210a, and cluster routers 1211a connected by a local cluster network 1212a. Similarly, computing cluster 1209b can include one or more computing devices 1200b, cluster storage arrays 1210b, and cluster routers 1211b connected by a local cluster network 1212b. Likewise, computing cluster 1209c can include one or more computing devices 1200c, cluster storage arrays 1210c, and cluster routers 1211c connected by a local cluster network 1212c.

In some embodiments, computing clusters 1209a, 1209b, 1209c can be a single computing device residing in a single computing center. In other embodiments, computing clusters 1209a, 1209b, 1209c can include multiple computing devices in a single computing center, or even multiple computing devices located in multiple computing centers located in diverse geographic locations. For example, FIG. 12 depicts each of computing clusters 1209a, 1209b, 1209c residing in different physical locations.

In some embodiments, data and services at computing clusters 1209a, 1209b, 1209c can be encoded as computer readable information stored in non-transitory, tangible computer readable media (or computer readable storage media) and accessible by other computing devices. In some embodiments, computing clusters 1209a, 1209b, 1209c can be stored on a single disk drive or other tangible storage media, or can be implemented on multiple disk drives or other tangible storage media located at one or more diverse geographic locations.

In some embodiments, each of computing clusters 1209a, 1209b, and 1209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1209a, for example, computing devices 1200a can be configured to perform various computing tasks of a conditioned, axial self-attention based neural network, and/or a computing device. In one embodiment, the various functionalities of a neural network, and/or a computing device can be distributed among one or more of computing devices 1200a, 1200b, 1200c. Computing devices 1200b and 1200c in respective computing clusters 1209b and 1209c can be configured similarly to computing devices 1200a in computing cluster 1209a. On the other hand, in some embodiments, computing devices 1200a, 1200b, and 1200c can be configured to perform different functions.

In some embodiments, computing tasks and stored data associated with a neural network, and/or a computing device can be distributed across computing devices 1200a, 1200b, and 1200c based at least in part on the processing requirements of a neural network, and/or a computing device, the processing capabilities of computing devices 1200a, 1200b, 1200c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1210a, 1210b, 1210c of computing clusters 1209a, 1209b, 1209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1200a, 1200b, 1200c of computing clusters 1209a, 1209b, 1209c, various active portions and/or backup portions of these components can be distributed across cluster storage arrays 1210a. 1210b, 1210c. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1211a, 1211b, 1211c in computing clusters 1209a, 1209b, 1209c can include networking equipment configured to provide internal and external communications for the computing clusters. For example, cluster routers 1211a in computing cluster 1209a can include one or more internet switching and routing devices configured to provide (i) local area network communications between computing devices 1200a and cluster storage arrays 1210a via local cluster network 1212a, and (ii) wide area network communications between computing cluster 1209a and computing clusters 1209b and 1209c via wide area network link 1213a to network 1006. Cluster routers 1211b and 1211c can include network equipment similar to cluster routers 1211a, and cluster routers 1211b and 1211c can perform similar networking functions for computing clusters 1209b and 1209b that cluster routers 1211a perform for computing cluster 1209a.

In some embodiments, the configuration of cluster routers 1211a, 1211b, 1211c can be based at least in part on the data communication requirements of the computing devices and cluster storage arrays, the data communications capabilities of the network equipment in cluster routers 1211a, 1211b, 1211c, the latency and throughput of local cluster networks 1212*a*, 1212*b*, 1212*c*, the latency, throughput, and cost of wide area network links 1213*a*, 1213*b*, 1213*c*, and/or other factors that can contribute to the cost, speed, fault-tolerance, resiliency, efficiency and/or other design criteria of the moderation system architecture.

What is claimed is:

1. A visual programming platform that enables the graphical development of software code, the visual programming platform comprising one or more processors, the visual programming platform configured to perform operations, the operations comprising:

obtaining a natural language description of a task to be performed by a computational pipeline;

processing the natural language description of the task with a machine learning coding system comprising one or more machine-learned models to generate, as an output of the machine learning coding system, a set of pseudocode that describes performance of the task;

processing the set of pseudocode that describes performance of the task with a compiler to generate a set of programming-language code that defines the computational pipeline for performing the task;

generating a graphical visualization of the computational pipeline defined by the set of programming-language code; and providing the graphical visualization of the computational pipeline for display in an interactive user interface that enables a human user to edit the graphical visualization to modify the set of programming-language code.

2. The visual programming platform of claim 1, wherein the machine learning coding system comprises one or more large language models.

3. The visual programming platform of claim 1, wherein the machine learning coding system comprises a machine-learned pseudocode drafting model configured to process the natural language description of the task to generate the set of pseudocode that describes performance of the task.

4. The visual programming platform of claim 3, wherein the machine learning coding system comprises a machine-learned node selection model configured to process the natural language description of the task to select one or more selected nodes from a library of nodes, wherein the one or more selected nodes are identified to the machine-learned pseudocode drafting model.

5. The visual programming platform of claim 4, wherein the one or more selected nodes are identified in a prompt supplied to the machine-learned pseudocode drafting model.

6. The visual programming platform of claim 5, wherein the prompt comprises a few-shot prompt that provides one or more examples of pseudocode output.

7. The visual programming platform of claim 1, wherein the natural language description of the task to be performed by the computational pipeline is input by the human user.

8. The visual programming platform of claim 1, wherein the computational pipeline comprises a machine learning pipeline that executes one or more machine learning models to process a pipeline input to generate a pipeline output.

9. The visual programming platform of claim 1, wherein the graphical visualization of the computational pipeline comprises an editable node-graph.

10. A computer-implemented method for finetuning a sequence processing model to perform a pseudocode drafting task, the method comprising:

obtaining, by a computing system comprising one or more computing devices, a training tuple, the training tuple comprising a natural language description of a computational pipeline and a set of programming-language code that defines the computational pipeline;

decompiling, by the computing system, the set of programming-language code to generate a set of ground truth pseudocode;

processing, by the computing system, the natural language description of the computational pipeline with the sequence processing model to generate a set of predicted pseudocode;

evaluating, by the computing system, a loss function that compares the set of predicted pseudocode with the set of ground truth pseudocode; and modifying, by the computing system, one or more values of one or more parameters of the sequence processing model based on the loss function.

11. The computer-implemented method of claim 10, wherein the natural language description was generated by a human.

12. The computer-implemented method of claim 10, wherein the natural language description was generated by a machine learning model.

13. The computer-implemented method of claim 10, wherein decompiling, by the computing system, the set of programming-language code to generate a set of ground truth pseudocode comprises applying, by the computing system, a set of inverse compiling rules to the set of programming-language code.

14. The computer-implemented method of claim 10, wherein the loss function evaluates whether the set of predicted pseudocode contains the same number, type, or sequence of nodes as the set of ground truth pseudocode.

15. One or more non-transitory computer-readable media that store computer-executable instructions that, when executed, cause a computing system to perform operations, the operations comprising:

obtaining a natural language description of a task to be performed by a computational pipeline;

processing the natural language description of the task with a machine learning coding system comprising one or more machine-learned models to generate, as an output of the machine learning coding system, a set of pseudocode that describes performance of the task;

processing the set of pseudocode that describes performance of the task with a compiler to generate a set of programming-language code that defines the computational pipeline for performing the task;

generating a graphical visualization of the computational pipeline defined by the set of programming-language code; and providing the graphical visualization of the computational pipeline for display in an interactive user interface that enables a human user to edit the graphical visualization to modify the set of programming-language code.

16. The one or more non-transitory computer-readable media of claim 15, wherein the machine learning coding system comprises one or more large language models.

17. The one or more non-transitory computer-readable media of claim 15, wherein the machine learning coding system comprises a machine-learned pseudocode drafting model configured to process the natural language description of the task to generate the set of pseudocode that describes performance of the task.

18. The one or more non-transitory computer-readable media of claim 17, wherein the machine learning coding system comprises a machine-learned node selection model configured to process the natural language description of the task to select one or more selected nodes from a library of nodes, wherein the one or more selected nodes are identified to the machine-learned pseudocode drafting model.

19. The one or more non-transitory computer-readable media of claim 18, wherein the one or more selected nodes are identified in a prompt supplied to the machine-learned pseudocode drafting model.

20. The one or more non-transitory computer-readable media of claim 19, wherein the prompt comprises a few-shot prompt that provides one or more examples of pseudocode output.

\* \* \* \* \*